(12) United States Patent
Liu

(10) Patent No.: US 12,739,066 B2
(45) Date of Patent: Sep. 15, 2026

(54) TRANSMISSION CONTROL METHOD AND APPARATUS, AND PDSCH RECEIVING METHOD AND APPARATUS

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 416 days.

(21) Appl. No.: 18/293,942

(22) PCT Filed: Aug. 6, 2021

(86) PCT No.: PCT/CN2021/111348
§ 371 (c)(1),
(2) Date: Jan. 31, 2024

(87) PCT Pub. No.: WO2023/010578
PCT Pub. Date: Feb. 9, 2023

(65) Prior Publication Data
US 2024/0340120 A1 Oct. 10, 2024

(51) Int. Cl.
*H04L 1/1867* (2023.01)
*H04L 1/1812* (2023.01)
(Continued)

(52) U.S. Cl.
CPC .......... *H04L 1/1893* (2013.01); *H04L 1/1812* (2013.01); *H04L 5/001* (2013.01); *H04W 72/0446* (2013.01)

(58) Field of Classification Search
CPC ..... H04L 1/1893; H04L 1/1812; H04L 5/001; H04L 1/1854; H04L 1/18; H04L 1/1822; H04L 1/1896; H04W 72/0446
See application file for complete search history.

(56) References Cited

U.S. PATENT DOCUMENTS

2015/0305016 A1* 10/2015 Dai ....................... H04L 5/0098 370/280
2018/0376482 A1 12/2018 Dinan
(Continued)

FOREIGN PATENT DOCUMENTS

CN 101789851 A 7/2010
CN 104518854 A 4/2015
(Continued)

OTHER PUBLICATIONS

ISA State Intellectual Property Office of the People's Republic of China, International Search Report Issued in Application No. PCT/CN2021/111348, May 7, 2022, WIPO, 4 pages.
(Continued)

*Primary Examiner* — Justin T Van Roie
(74) *Attorney, Agent, or Firm* — Volpe Koenig

(57) ABSTRACT

A transmission control method includes: transmitting, on a primary component carrier, a first physical downlink shared channel (PDSCH) to a terminal, and determining a first process identifier (PID) of a hybrid automatic repeat request (HARQ) corresponding to the first PDSCH; and before HARQ information of the first PID transmitted by the terminal is received on a secondary component carrier, not transmitting a second PDSCH to the terminal. Where a PID of an HARQ corresponding to the second PDSCH is the same as the first PID, and the secondary component carrier is provided for the terminal to transmit an HARQ of the PID.

16 Claims, 7 Drawing Sheets

(51) Int. Cl.
*H04L 5/00* (2006.01)
*H04W 72/0446* (2023.01)

(56) References Cited

U.S. PATENT DOCUMENTS

| | | | | |
|---|---|---|---|---|
| 2019/0109677 | A1* | 4/2019 | Wang | H04L 5/1469 |
| 2020/0221523 | A1* | 7/2020 | Hosseini | H04W 76/15 |
| 2021/0084650 | A1* | 3/2021 | Fan | H04L 5/0098 |
| 2021/0091880 | A1* | 3/2021 | Kim | H04W 72/23 |
| 2023/0300940 | A1* | 9/2023 | Jang | H04W 24/10 370/329 |

FOREIGN PATENT DOCUMENTS

| | | | | |
|---|---|---|---|---|
| CN | 106470050 | A | 3/2017 | |
| WO | 2021092767 | A1 | 5/2021 | |
| WO | WO-2022077304 | A1 * | 4/2022 | H04W 72/02 |

OTHER PUBLICATIONS

State Intellectual Property Office of the People's Republic of China, Office Action and Search Report Issued in Application No. 2021800022916, Feb. 22, 2025, 9 pages.
Nokia, Nokia Shanghai Bell, "Support of 14-HARQ processes in DL for eMTC", R1-2008074, 3GPP TSG-RAN WG1 Meeting #103-e, e-Meeting, Oct. 26-Nov. 13, 2020 , 8 pages.
ISA State Intellectual Property Office of the People's Republic of China, Written Opinion of the International Searching Authority Issued in Application No. PCT/CN2021/111348, May 7, 2022, WIPO, 7 pages.

* cited by examiner

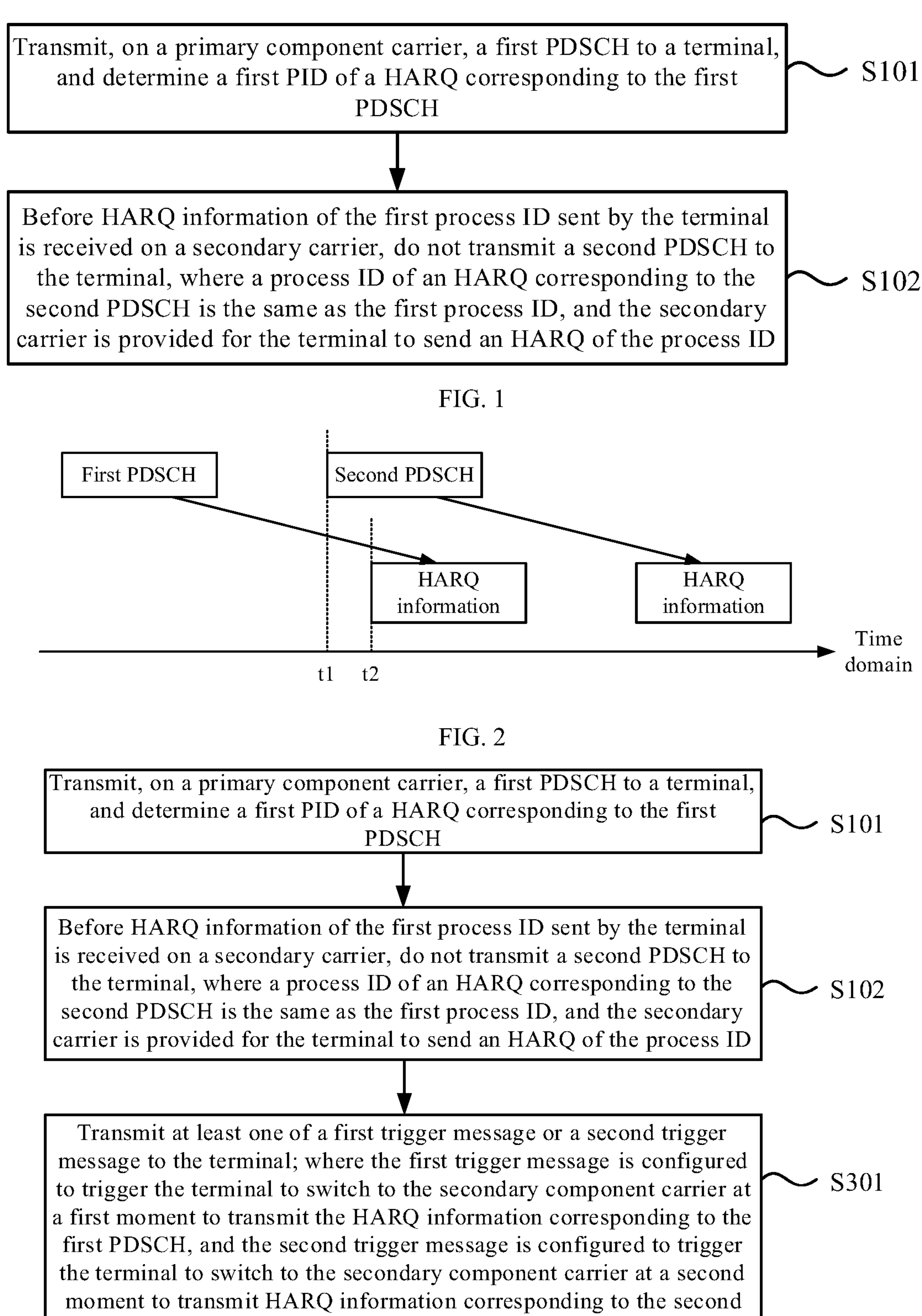
Transmit, on a primary component carrier, a first PDSCH to a terminal, and determine a first PID of a HARQ corresponding to the first PDSCH
S101
Before HARQ information of the first process ID sent by the terminal is received on a secondary carrier, do not transmit a second PDSCH to the terminal, where a process ID of an HARQ corresponding to the second PDSCH is the same as the first process ID, and the secondary carrier is provided for the terminal to send an HARQ of the process ID
S102
FIG. 1
First PDSCH
Second PDSCH
HARQ information
HARQ information
Time domain
t1
t2
FIG. 2
Transmit, on a primary component carrier, a first PDSCH to a terminal, and determine a first PID of a HARQ corresponding to the first PDSCH
S101
Before HARQ information of the first process ID sent by the terminal is received on a secondary carrier, do not transmit a second PDSCH to the terminal, where a process ID of an HARQ corresponding to the second PDSCH is the same as the first process ID, and the secondary carrier is provided for the terminal to send an HARQ of the process ID
S102
Transmit at least one of a first trigger message or a second trigger message to the terminal; where the first trigger message is configured to trigger the terminal to switch to the secondary component carrier at a first moment to transmit the HARQ information corresponding to the first PDSCH, and the second trigger message is configured to trigger the terminal to switch to the secondary component carrier at a second moment to transmit HARQ information corresponding to the second PDSCH
S301
FIG. 3

Transmit, on a primary component carrier, a first PDSCH, a second PDSCH, a first trigger message and a second trigger message to a terminal, where the first trigger message is configured to trigger the terminal to switch to a secondary component carrier to transmit HARQ information corresponding to the first PDSCH, and the second trigger message is configured to trigger the terminal to switch to the secondary component carrier to transmit HARQ information corresponding to the second PDSCH — S401

↓

Receive, on a first time domain resource of the secondary component carrier, the HARQ information corresponding to the first PDSCH from the terminal, and receive, on a second time domain resource of the secondary component carrier, the HARQ information corresponding to the second PDSCH from the terminal, where when a moment of transmitting the first trigger message is earlier than a moment of transmitting the second trigger message, the first time domain resource is earlier than the second time domain resource — S402

FIG. 4

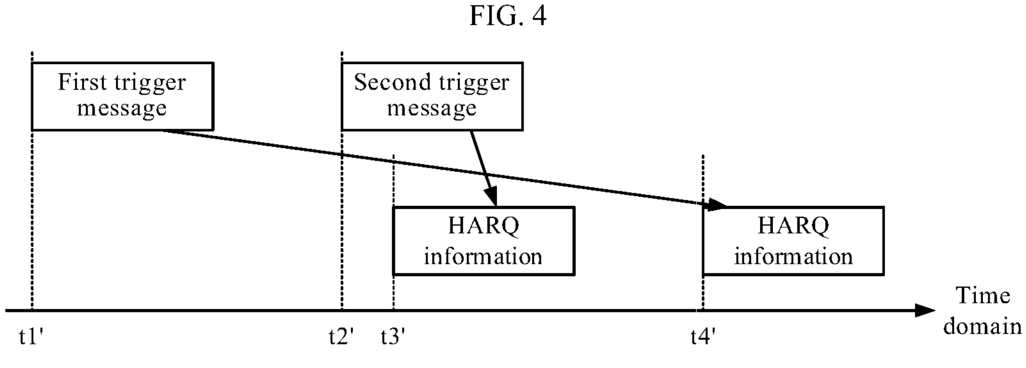

FIG. 5

Transmit a first trigger message and a second trigger message to a terminal; where the first trigger message is configured to trigger the terminal to switch to a secondary component carrier to transmit a HARQ corresponding to a first PDSCH, and the second trigger message is configured to trigger the terminal to switch to the secondary component carrier to transmit an HARQ corresponding to a second PDSCH; when a time domain resource for transmitting the first PDSCH is earlier than a time domain resource for transmitting the second PDSCH, a moment of transmitting the first trigger message is earlier than a moment of transmitting the second trigger message — S601

FIG. 6

Figures 11, 12:
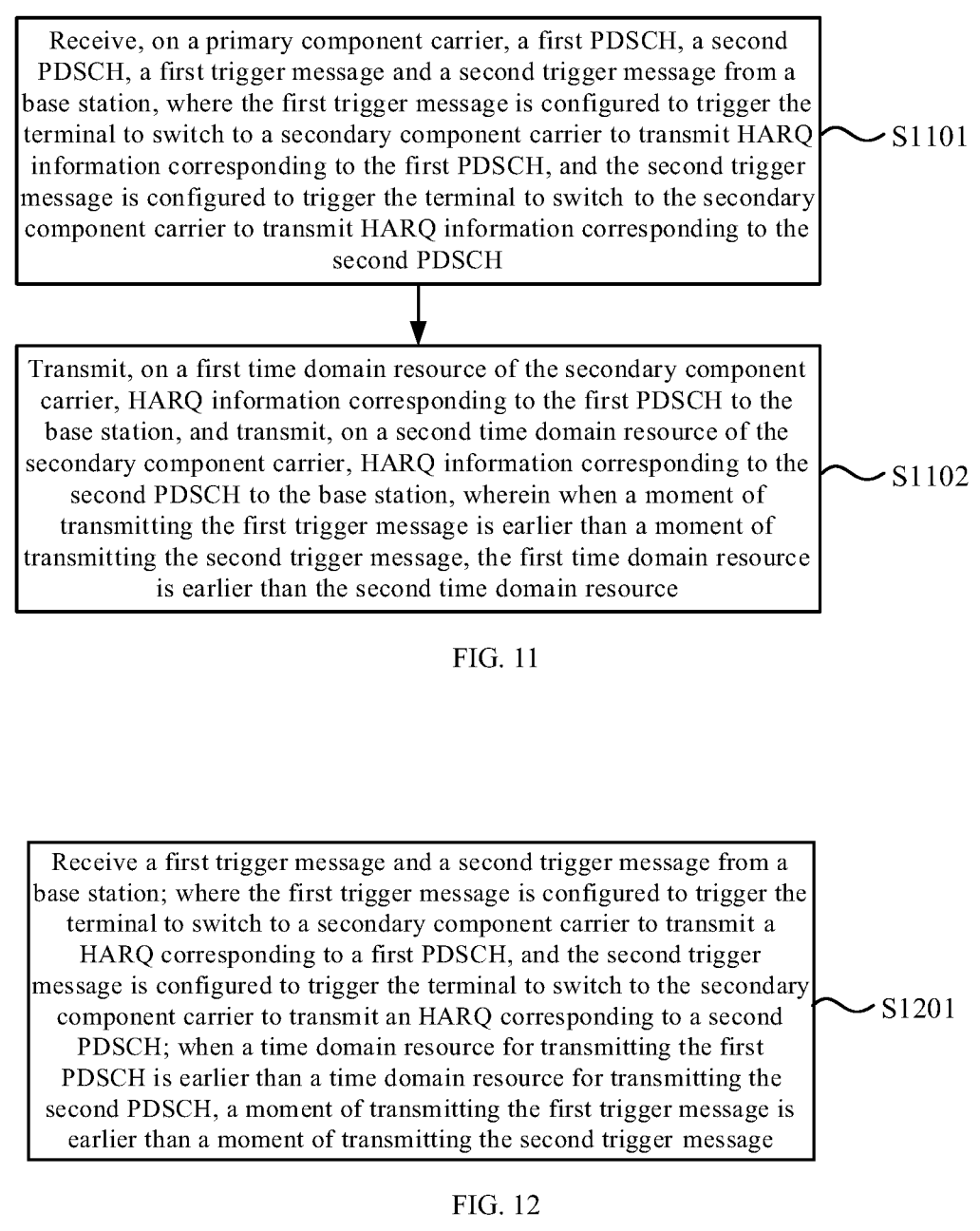

Receive, on a primary component carrier, a first PDSCH, a second PDSCH, a first trigger message and a second trigger message from a base station, where the first trigger message is configured to trigger the terminal to switch to a secondary component carrier to transmit HARQ information corresponding to the first PDSCH, and the second trigger message is configured to trigger the terminal to switch to the secondary component carrier to transmit HARQ information corresponding to the second PDSCH

S1101

Transmit, on a first time domain resource of the secondary component carrier, HARQ information corresponding to the first PDSCH to the base station, and transmit, on a second time domain resource of the secondary component carrier, HARQ information corresponding to the second PDSCH to the base station, wherein when a moment of transmitting the first trigger message is earlier than a moment of transmitting the second trigger message, the first time domain resource is earlier than the second time domain resource

Receive a first trigger message and a second trigger message from a base station; where the first trigger message is configured to trigger the terminal to switch to a secondary component carrier to transmit a HARQ corresponding to a first PDSCH, and the second trigger message is configured to trigger the terminal to switch to the secondary component carrier to transmit an HARQ corresponding to a second PDSCH; when a time domain resource for transmitting the first PDSCH is earlier than a time domain resource for transmitting the second PDSCH, a moment of transmitting the first trigger message is earlier than a moment of transmitting the second trigger message

TRANSMISSION CONTROL METHOD AND APPARATUS, AND PDSCH RECEIVING METHOD AND APPARATUS

CROSS REFERENCE TO RELATED APPLICATIONS

This application is a National Phase of International Application No. PCT/CN2021/111348, filed on Aug. 6, 2021, the entire contents of which are incorporated herein by reference in their entireties.

TECHNICAL FIELD

The present disclosure relates to the field of communication technologies, and in particular to transmission control methods, physical downlink shared channel (PDSCH) receiving methods, transmission control apparatuses, PDSCH receiving apparatuses, communication devices and computer readable storage mediums.

BACKGROUND

In a communication process between a base station and a terminal, the base station may transmit a physical downlink shared channel (PDSCH) to the terminal, and the terminal may transmit hybrid automatic repeat request (HARQ) information to the base station to notify the base station of whether the terminal successfully decodes the PDSCH.

SUMMARY

According to a first aspect of embodiments of the present disclosure, there is provided a transmission control method, which is performed by a base station. The method includes: transmitting, on a primary component carrier, a first physical downlink shared channel (PDSCH) to a terminal, and determining a first process identifier (PID) of a hybrid automatic repeat request (HARQ) corresponding to the first PDSCH; and before HARQ information of the first PID sent by the terminal is received on a secondary component carrier, not transmitting a second PDSCH to the terminal, where a PID of an HARQ corresponding to the second PDSCH is the same as the first PID, and the secondary component carrier is provided for the terminal to transmit an HARQ corresponding to a PID.

According to a second aspect of embodiments of the present disclosure, there is provided a transmission control method, which is performed by a base station. The method includes: transmitting, on a primary component carrier, a first physical downlink shared channel (PDSCH), a second PDSCH, a first trigger message and a second trigger message to a terminal, where the first trigger message is configured to trigger the terminal to switch to a secondary component carrier to transmit hybrid automatic repeated request (HARQ) information corresponding to the first PDSCH, and the second trigger message is configured to trigger the terminal to switch to the secondary component carrier to transmit HARQ information corresponding to the second PDSCH; and receiving, on a first time domain resource of the secondary component carrier, the HARQ information corresponding to the first PDSCH from the terminal, and receiving, on a second time domain resource of the secondary component carrier, the HARQ information corresponding to the second PDSCH from the terminal, where when a moment of transmitting the first trigger message is earlier than a moment of transmitting the second trigger message, the first time domain resource is earlier than the second time domain resource.

According to a third aspect of embodiments of the present disclosure, there is provided a transmission control method, which is performed by a base station. The method includes: transmitting a first trigger message and a second trigger message to a terminal; where the first trigger message is configured to trigger the terminal to switch to a secondary component carrier to transmit a hybrid automatic repeated request (HARQ) corresponding to a first physical downlink shared channel (PDSCH), and the second trigger message is configured to trigger the terminal to switch to the secondary component carrier to transmit an HARQ corresponding to a second PDSCH; when a time domain resource for transmitting the first PDSCH is earlier than a time domain resource for transmitting the second PDSCH, a moment of transmitting the first trigger message is earlier than a moment of transmitting the second trigger message.

According to a fourth aspect of embodiments of the present disclosure, there is provided a communication device, including a processor; and a memory storing computer programs, where the computer programs, when executed by the processor, cause the processor to perform any of the included transmission control methods.

According to a fifth aspect of embodiments of the present disclosure, there is provided a non-transitory computer readable storage medium, storing computer programs, where the computer programs, when executed by a processor, cause the processor to perform any of the included transmission control methods.

BRIEF DESCRIPTION OF THE DRAWINGS

In order to more clearly describe the technical solutions of the embodiments of the present disclosure, the accompanying drawing involved in the descriptions of the embodiments will be briefly introduced below. Apparently, the following drawings only show some embodiments of the present disclosure. Those skilled in the art may obtain other relevant drawings based on these drawings without carrying out creative work.

FIG. 1 is a schematic flowchart illustrating a transmission control method according to an embodiment of the present disclosure.

FIG. 2 is a time domain relationship diagram of a PDSCH and HARQ information according to an embodiment of the present disclosure.

FIG. 3 is a schematic flowchart illustrating a transmission control method according to another embodiment of the present disclosure.

FIG. 4 is a schematic flowchart illustrating a transmission control method according to yet another embodiment of the present disclosure.

FIG. 5 is a time domain relationship diagram of a trigger message and HARQ information according to an embodiment of the present disclosure.

FIG. 6 is a schematic flowchart illustrating a transmission control method according to still another embodiment of the present disclosure.

FIG. 11 is a schematic flowchart illustrating a PDSCH receiving method according to yet another embodiment of the present disclosure.

FIG. 12 is a schematic flowchart illustrating a PDSCH receiving method according to still another embodiment of the present disclosure.

DETAILED DESCRIPTION OF THE EMBODIMENTS

Figure 7:
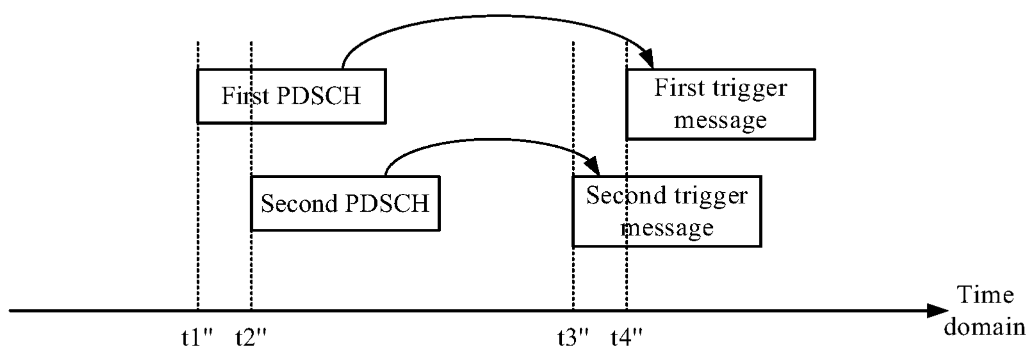
FIG. 7 is a time domain relationship diagram of a PCSCH and a trigger message according to an embodiment of the present disclosure.

The technical solutions of embodiments of the present disclosure will be described clearly and fully below in combination with drawings in the embodiments of the present disclosure. It is apparent that the described embodiments are merely some of embodiments of the present disclosure rather than all embodiments. Other embodiments obtained by those of ordinary skill in the art based on the embodiments in the present disclosure without carrying out creative work shall all fall into the scope of protection of the present disclosure.

The terms used in the present disclosure are for the purpose of describing particular embodiments only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only configured to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

For the purpose of conciseness and ease of understanding, the terms configured to represent a size relationship herein are "greater than", "less than", "higher than" and "lower than". But, those skilled in the arts can understand that the term "greater than" also includes the meaning of "greater than or equal to", and the term "less than" also includes the meaning of "less than or equal to"; the term "higher than" includes the meaning of "higher than or equal to", and the term "lower than" also includes the meaning of "lower than or equal to".

In an embodiment, a base station may transmit a physical downlink shared channel (PDSCH) to a terminal and the terminal may transmit hybrid automatic repeated request (HARQ) information to the base station to notify the base station of whether the terminal successfully decodes the PDSCH. For example, if the terminal successfully decodes the PDSCH, the HARQ information transmitted to the base station is acknowledgment (ACK); for example, if the terminal fails to decode the PDSCH, the HARQ information transmitted to the base station is negative-acknowledgment (NACK).

The HARQ information may be transmitted by a physical uplink control channel (PUCCH) resource, where the resource for transmitting the HARQ may be determined based on K1. When the physical uplink control channel (PUCCH) resource indicated by the K1 for transmitting the HARQ is not available or this feedback operation is discarded, or retransmission is triggered, or this feedback operation is delayed, these circumstances all can affect the delay and reliability of HARQ feedback.

In a communication scenario of carrier aggregation (CA), the terminal may transmit HARQ information on a PUCCH resource of a primary component carrier. If the PUCCH resource on the primary component carrier is not available temporarily due to the any of the included several circumstances, the terminal may be indicated to switch to a secondary component carrier to transmit the HARQ information, thus the delay of HARQ information feedback is reduced, and the reliability of HARQ information feedback is increased.

In an embodiment, the base station may communicate with the terminal in a carrier aggregation (CA) scenario, and the terminal may transmit HARQ information on a physical uplink control channel (PUCCH) resource of a primary component carrier (a carrier of a primary cell).

However, in some cases, the PUCCH resource for transmitting the HARQ information is not available temporarily. In order to avoid a large delay of the HARQ feedback, the base station may transmit a trigger message to the terminal to trigger the terminal to switch to a resource of a secondary component carrier (a carrier of a secondary cell) to transmit the HARQ information.

In the process, the base station and the terminal need to perform multiple operations. The base station transmits a PDSCH to the terminal and also transmits a trigger message to the terminal in response to unavailability of the resource for transmitting the HARQ information on the primary component carrier. The terminal needs to receive the PDSCH and also receive the trigger message in response to unavailability of the resource for transmitting the HARQ information on the primary component carrier, and switch to the secondary component carrier based on the trigger message to transmit the HARQ information.

Since the base station may transmit a PDSCH several times, each of the PDSCHs transmitted will cause the base station and the terminal to perform the multiple operations several times. Therefore, it is possible to bring disorder to the operation sequence, leading to some technical problems.

For example, for two PDSCHs transmitted by the base station to the terminal, i.e. a first PDSCH and a second PDSCH, the base station firstly transmits the first PDSCH to the terminal and then transmits the second PDSCH to the terminal. When the base station also transmits a trigger message to the terminal to trigger the terminal to switch to the secondary component carrier to feed back the HARQ information, the HARQ information corresponding to the second PDSCH may be firstly fed back to the base station by the terminal and the HARQ information corresponding to the first PDSCH is then fed back to the base station by the terminal. This is disallowed at the base station side. The present application overcomes these technical issues.

With the following embodiments mainly involving two PDSCHs transmitted by the base station to the terminal, the technical solutions of the present disclosure will be illustrated below.

FIG. 1 is a schematic flowchart illustrating a transmission control method according to an embodiment of the present disclosure. The transmission control method in this embodiment may be performed by a base station. The base station may communicate with a terminal. The terminal includes but not limited to a communication device such as a smart phone, a tablet computer, a wearable device, a sensor or an internet-of-things device or the like. The base station includes but not limited to a base station in a communication system of 4th generation (4G), 5th generation (5G) or 6th generation (6G) or the like.

As shown in FIG. 1, the transmission control method may include the following steps S101 to S102.

At step S101, a first physical downlink shared channel (PDSCH) is transmitted to a terminal on a primary component carrier, and a first process identifier (PID) of a hybrid automatic repeat request (HARQ) corresponding to the first PDSCH is determined.

At step S102, before HARQ information of the first PID transmitted by the terminal is received on a secondary component carrier, a second PDSCH is not transmitted to the terminal, where a PID of an HARQ corresponding to the second PDSCH is the same as the first PID, and the secondary component carrier is provided for the terminal to transmit an HARQ of the PID.

In an embodiment, when transmitting PDSCHs to the terminal, the base station may determine PIDs of the HARQs corresponding to the PDSCHs. The PIDs corresponding to the PDSCHs may be configured by the base station. Therefore, the HARQ information, transmitted by the terminal to the base station based on the corresponding PDSCH, may have a corresponding PID. Additionally, the terminal is able to transmit any of the HARQ of the corresponding PID.

In this embodiment, in order to distinguish the PIDs corresponding to different PDSCHs, the HARQ PID corresponding to the first PDSCH is referred to as a first PID, and the HARQ PID corresponding to the second PDSCH is referred to as a second PID. Further, the first PDSCH and the second PDSCH are different PDSCHs (for example, carry different information).

FIG. 2 is a time domain relationship diagram of a PDSCH and HARQ information according to an embodiment of the present disclosure.

As shown in FIG. 2, after the base station transmits the first PDSCH to the terminal on the primary component carrier, if the base station on the secondary component carrier, when not receiving the HARQ information of the first PID transmitted by the terminal, transmits the second PDSCH to the terminal on the primary component carrier, namely, a moment t2 of receiving the HARQ information corresponding to the first PDSCH is later than a moment t1 of transmitting the second PDSCH to the terminal, and the second PID of the HARQ corresponding to the second PDSCH is the same as the first PID, the transmission is disallowed at the base station side. In other words, until the moment t2, wherein the HARQ information corresponding to the first PDSCH is received, the base station will not transmit the second PDSCH to the terminal on the primary component carrier, i.e., the moment t1. A "moment" can be any specific time point or window of time in a timeframe or on a timeline.

In the embodiments of the present disclosure, before receiving, on the secondary component carrier, the HARQ information of the first PID from the terminal, the base station will not transmit a second PDSCH with the same HARQ PID as the first PID to the terminal. Thus ensuring communication with the terminal based on a logic allowed by the base station.

Before the base station receives, on the secondary component carrier, the HARQ information of the first PID from the terminal, the base station may, if transmitting a second PDSCH to the terminal, transmit a second PDSCH with a HARQ PID different from the first PID to the terminal. Alternatively, after the base station receives, on the secondary component carrier, the HARQ information of the first PID from the terminal, the base station may transmit a second PDSCH with the same PID as the first PID to the terminal.

In an embodiment, the HARQ information may include at least one of: confirming that HARQ information of PDSCH is successfully decoded and confirming HARQ information of PDSCH is not successfully decoded.

When the terminal confirms a PDSCH is successfully decoded, the HARQ information transmitted to the base station may be HARQ acknowledgment information, i.e. HARQ-ACK. When the terminal confirms a PDSCH is not successfully decoded, the HARQ information transmitted to the base station may be HARQ negative-acknowledgment information, i.e. HARQ-NACK.

FIG. 3 is a schematic flowchart illustrating another transmission control method according to an embodiment of the present disclosure. As shown in FIG. 3, the method includes steps S101 and S102, not repeated, and further includes the following step S301.

At step S301, at least one of a first trigger message or a second trigger message is transmitted to the terminal.

The first trigger message is configured to trigger the terminal to switch to the secondary component carrier at a first moment to transmit the HARQ information corresponding to the first PDSCH. The second trigger message is configured to trigger the terminal to switch to the secondary component carrier at a second moment to transmit the HARQ information corresponding to the second PDSCH.

In an embodiment, when transmitting the first PDSCH and the second PDSCH to the terminal, the base station may also transmit the first trigger message and/or the second trigger message to the terminal based on requirements.

For example, when a PUCCH resource for transmitting the HARQ information corresponding to the first PDSCH on the primary component carrier is not available temporarily, the first trigger message may be transmitted to the terminal to trigger the terminal to switch to the secondary component carrier to transmit the HARQ information corresponding to the first PDSCH. For example, a switch to the secondary component carrier is done at the first moment, where the first moment may be configured by the base station based on requirements.

For example, when a PUCCH resource for transmitting the HARQ information corresponding to the second PDSCH on the primary component carrier is not available temporarily, the second trigger message may be transmitted to the terminal to trigger the terminal to switch to the secondary component carrier to transmit the HARQ information corresponding to the second PDSCH. For example, a switch to the secondary component carrier at the second moment, where the second moment may be configured by the base station based on requirements.

It is to be noted that the first trigger message and the second trigger message may indicate the terminal to switch to a same secondary component carrier or different secondary component carrier, which may be determined by the base station based on requirements.

In an embodiment, the temporary unavailability of the resource may include one of: resource unavailability, discard of this feedback operation, retransmission trigger and delay of this feedback operation.

FIG. 4 is a schematic flowchart illustrating a transmission control method according to an embodiment of the present disclosure. The transmission control method in this embodiment may be performed by a base station. The base station may communicate with a terminal. The terminal includes but not limited to a communication device such as a smart phone, a tablet computer, a wearable device, a sensor or an internet-of-things device or the like. The base station includes but not limited to a base station in a communication system of 4G, 5G or 6G or the like.

As shown in FIG. 4, the transmission control method may include the following steps S401 to S402.

At step S401, a first PDSCH, a second PDSCH, a first trigger message, and a second trigger message are transmitted on a primary component carrier to a terminal. The first trigger message is configured to trigger the terminal to switch to a secondary component carrier to transmit HARQ information corresponding to the first PDSCH and the second trigger message is configured to trigger the terminal to switch to the secondary component carrier to transmit HARQ information corresponding to the second PDSCH.

At step S402, on a first time domain resource of the secondary component carrier, the HARQ information corresponding to the first PDSCH is received from the terminal, and on a second time domain resource of the secondary component carrier, the HARQ information corresponding to the second PDSCH is received from the terminal. Where when a moment of transmitting the first trigger message is earlier than a moment of transmitting the second trigger message, the first time domain resource is earlier than the second time domain resource.

In an embodiment, the base station may also transmit the first trigger message and the second trigger message to the terminal in addition to transmitting the first PDSCH and the second PDSCH.

For example, when the PUCCH resource for transmitting the HARQ information corresponding to the first PDSCH on the primary component carrier is temporarily unavailable, the first trigger message may be transmitted to the terminal to trigger the terminal to switch to the secondary component carrier to transmit the HARQ information corresponding to the first PDSCH.

For example, when the PUCCH resource for transmitting the HARQ information corresponding to the second PDSCH on the primary component carrier is temporarily unavailable, the second trigger message may be transmitted to the terminal to trigger the terminal to switch to the secondary component carrier to transmit the HARQ information corresponding to the second PDSCH.

In an embodiment, the terminal may switch to the secondary component carrier to transmit the HARQ information corresponding to the first PDSCH and the HARQ information corresponding to the second PDSCH to the base station. The base station may, on the first time domain resource of the secondary component carrier, receive the HARQ information corresponding to the first PDSCH from the terminal, and on the second time domain resource of the secondary component carrier, receive the HARQ information corresponding to the second PDSCH from the terminal.

FIG. 5 is a time domain relationship diagram of a trigger message and HARQ information according to an embodiment of the present disclosure.

As shown in FIG. 5, when a moment t1' of transmitting, by the base station, the first trigger message is earlier than a moment t2' of transmitting, by the base station, the second trigger message, namely, to that the base station firstly transmits the first trigger message and then transmits the second trigger message, the base station generally defaults that the HARQ information corresponding to the first PDSCH is firstly received and then the HARQ information corresponding to the second PDSCH is received.

If the first time domain resource t4' is later than the second time domain resource t3', that is, if the terminal firstly transmits the HARQ information corresponding to the second PDSCH to the base station and then transmits the HARQ information corresponding to the first PDSCH to the base station, this is disallowed at the base station side.

In the embodiments of the present disclosure, when the moment of transmitting the first trigger message is earlier than the moment of transmitting the second trigger message, the base station may set the first time domain resource to be earlier than the second time domain resource, for example, by configuring the first trigger message and the second trigger message. Thus, ensuring the terminal firstly transmits the HARQ information corresponding to the first PDSCH to the base station and then transmits the HARQ information corresponding to the second PDSCH to the base station. In this way, the base station can correctly determine the firstly-received HARQ information corresponding to the first trigger message as the HARQ information corresponding to the first PDSCH.

In an embodiment, the base station may also, based on requirements, set the moment of transmitting the second trigger message to be later than the first time domain resource. In this case, the base station can transmit the second trigger message to the terminal only when receiving the HARQ information corresponding to the first PDSCH on the first time domain resource and thus the terminal can transmit the HARQ information corresponding to the second PDSCH to the base station. As a result, it is guaranteed that the second time domain resource on which the base station receives the HARQ information corresponding to the second PDSCH is later than the first time domain resource. In this way, the base station can correctly determine the firstly-received HARQ information corresponding to the first PDSCH as the HARQ information corresponding to the first trigger message, i.e. the HARQ information corresponding to the first PDSCH. Therefore, providing an improvement over the technical issues of currently known systems and methods.

In an embodiment, the first time domain resource includes an ending position of the HARQ information corresponding to the first PDSCH on time domain, and the second time domain resource includes an ending position of the HARQ information corresponding to the second PDSCH on a time domain. A “time domain” is any period of time, timeframe, timeline, or window of time, where various points can be shown or various changes in features such transmitting or receiving signals can be shown.

It is to be noted that the meanings expressed by the first time domain resource and the second time domain resource respectively may be determined based on requirements. For example, as shown in FIG. 5, the first time domain resource is a start position of the HARQ information corresponding to the first PDSCH on time domain, and the second time domain resource is a start position of the HARQ information corresponding to the second PDSCH on time domain. Alternatively, the first time domain resource is an ending position of the HARQ information corresponding to the first PDSCH on time domain, and the second time domain resource is a start position of the HARQ information corresponding to the second PDSCH on time domain.

In an embodiment, when a time domain resource for transmitting the first PDSCH is earlier than a time domain resource for transmitting the second PDSCH, the moment of transmitting the first trigger message is earlier than the moment of transmitting the second trigger message.

In an embodiment, when the time domain resource for transmitting, by the base station, the first PDSCH is earlier than the time domain resource for transmitting, by the base station, the second PDSCH, the moment of transmitting the first trigger message may be set to be earlier than the moment of transmitting the second trigger message. Thus, it is guaranteed that the terminal can, in a case of firstly receiving the first PDSCH and then the second PDSCH, firstly receive the first trigger message and then the second trigger message. Therefore, the terminal can be correctly triggered based on the first trigger message to switch to the secondary component carrier to transmit the HARQ corresponding to the first PDSCH.

FIG. 6 is a schematic flowchart illustrating a transmission control method according to an embodiment of the present disclosure. The transmission control method in this embodiment may be performed by a base station. The base station may communicate with a terminal. The terminal includes but not limited to a communication device such as a smart phone, a tablet computer, a wearable device, a sensor or an internet-of-things device or the like. The base station includes but not limited to a base station in a communication system of 4G, 5G or 6G or the like.

As shown in FIG. 6, the transmission control method may include the following step S601.

At step S601, a first trigger message and a second trigger message are transmitted to a terminal; where the first trigger message is configured to trigger the terminal to switch to a secondary component carrier to transmit a HARQ corresponding to a first PDSCH, and the second trigger message is configured to trigger the terminal to switch to the secondary component carrier to transmit an HARQ corresponding to a second PDSCH; when a time domain resource for transmitting the first PDSCH is earlier than a time domain resource for transmitting the second PDSCH, a moment of transmitting the first trigger message is earlier than a moment of transmitting the second trigger message.

In an embodiment, the base station may transmit the first trigger message and the second trigger message to the terminal in addition to transmitting the first PDSCH and the second PDSCH to the terminal. The first trigger message and the second trigger message may be transmitted on a physical downlink control channel (PDCCH) resource.

For example, when a PUCCH resource for transmitting the HARQ information corresponding to the first PDSCH on the primary component carrier is not available temporarily, the first trigger message may be transmitted to the terminal to trigger the terminal to switch to the secondary component carrier to transmit the HARQ information corresponding to the first PDSCH.

For example, when a PUCCH resource for transmitting the HARQ information corresponding to the second PDSCH on the primary component carrier is not available temporarily, the second trigger message may be transmitted to the terminal to trigger the terminal to switch to the secondary component carrier to transmit the HARQ information corresponding to the second PDSCH.

FIG. 7 is a time domain relationship diagram of a PDSCH and a trigger message according to an embodiment of the present disclosure.

As shown in FIG. 7, when the time domain resource t1" for transmitting the first PDSCH is earlier than the time domain resource t2" for transmitting the second PDSCH, if the first moment t3" is later than the second moment t4", that is, when the base station firstly transmits the first PDSCH to the terminal and then transmits the second PDSCH to the terminal, if the moment of transmitting the first trigger message is later than the moment of transmitting the second trigger message, the terminal will firstly receive the first PDSCH and then the second PDSCH but firstly receive the second trigger message and then the first trigger message. This is disallowed at the base station side.

In the embodiments of the present disclosure, when the time domain resource for transmitting, by the base station, the first PDSCH is earlier than the time domain resource for transmitting, by the base station, the second PDSCH, the moment of transmitting the first trigger message may be set to be earlier than the moment of transmitting the second trigger message. Thus, it is ensured that the terminal can, in a case of firstly receiving the first PDSCH and then the second PDSCH, firstly receive the first trigger message and then the second trigger message. Therefore, the terminal can be correctly triggered based on the first trigger message to switch to the secondary component carrier to transmit the HARQ corresponding to the first PDSCH. Therefore, providing an improvement over the technical issues of currently known systems and methods.

In an embodiment, the first trigger message triggers the terminal to switch to the secondary component carrier at the first moment to transmit the HARQ corresponding to the first PDSCH. The second trigger message triggers the terminal to switch to the secondary component carrier at the second moment to transmit the HARQ corresponding to the second PDSCH.

When the time domain resource for transmitting the first trigger message is earlier than the time domain resource for transmitting the second trigger message, the first moment is earlier than the second moment.

In an embodiment, the first trigger message may trigger the terminal to switch to the secondary component carrier at the first moment to transmit the HARQ corresponding to the first PDSCH, and the second trigger message may trigger the terminal to switch to the secondary component carrier at the second moment to transmit the HARQ corresponding to the second PDSCH, where the first moment and the second moment may be set by the base station based on requirements.

In the embodiments of the present disclosure, when the time domain resource for transmitting the first trigger message is earlier than the time domain resource for transmitting the second trigger message, the first moment may be set to be earlier than the second moment. Therefore, it can be guaranteed that in a case that the terminal firstly receives the first trigger message and then the second trigger message, the first moment at which the first trigger message triggers the terminal to transmit HARQ is also earlier than the second moment at which the second trigger message triggers the terminal to transmit HARQ. In this way, switching can be correctly performed to the secondary component carrier based on the first moment to transmit the HARQ corresponding to the first trigger message, namely, the HARQ corresponding to the first PDSCH.

Figure 8:
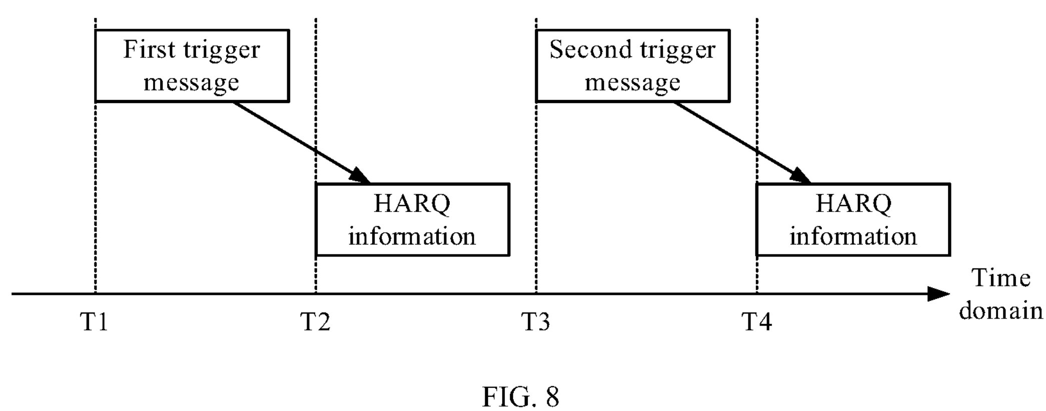
FIG. 8 is a time domain relationship diagram of a trigger message and HARQ information according to an embodiment of the present disclosure.

FIG. 8 is a time domain relationship diagram of a trigger message and HARQ information according to an embodiment of the present disclosure.

As shown in FIG. 8, the base station may set the moment T3 of transmitting the second trigger message to be later than the first time domain resource T2. That is, when the base station firstly transmits the first trigger message at T1 and transmits the second trigger message after T2, the base station may, after receiving the HARQ information corresponding to the first PDSCH on the first time domain resource, transmit the second trigger message to the terminal at T3. Thus, the terminal can further transmit the HARQ information corresponding to the second PDSCH to the base station. In this case, it is guaranteed that the first moment T2 at which the first trigger message triggers the terminal to transmit HARQ is surely earlier than the second moment T4 at which the second trigger message triggers the terminal to transmit HARQ. Therefore, the terminal can correctly switch to the secondary component carrier based on the first moment to transmit the HARQ corresponding to the first trigger message, namely, the HARQ corresponding to the first PDSCH.

In an embodiment, when the moment of transmitting the first trigger message is earlier than the moment of transmitting the second trigger message, the first time domain resource is earlier than the second time domain resource.

In an embodiment, when the moment of transmitting the first trigger message is earlier than the moment of transmitting the second trigger message, the base station may set the first time domain resource to be earlier than the second time domain resource. For example, configuring the first trigger message and the second trigger message, to ensure the terminal firstly transmits the HARQ information corresponding to the first PDSCH to the base station and then transmits the HARQ information corresponding to the second PDSCH to the base station. In this way, the base station can correctly determine the firstly-received HARQ information corresponding to the first trigger message as the HARQ information corresponding to the first PDSCH.

Figure 9:
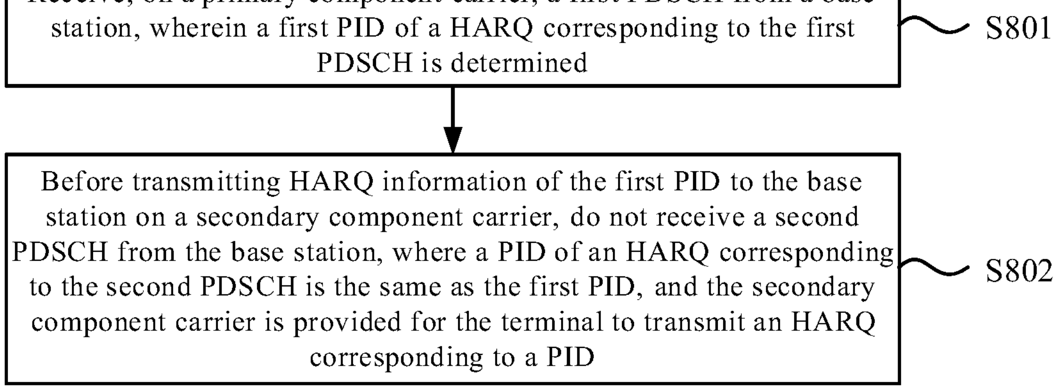
FIG. 9 is a schematic flowchart illustrating a PDSCH receiving method according to an embodiment of the present disclosure.

FIG. 9 is a schematic flowchart illustrating a PDSCH receiving method according to an embodiment of the present disclosure. The PDSCH receiving method in this embodiment may be performed by a terminal. The terminal may communicate with a base station. The terminal includes but not limited to a communication device such as a smart phone, a tablet computer, a wearable device, a sensor or an internet-of-things device or the like. The base station includes but not limited to a base station in a communication system of 4G, 5G or 6G or the like.

As shown in FIG. 9, the PDSCH receiving method may include the following steps S801 to S802.

At step S801, a first PDSCH is received on a primary component carrier from a base station, where a first PID of a HARQ corresponding to the first PDSCH is determined.

At step S802, before HARQ information of the first PID is transmitted on a secondary component carrier to the base station, a second PDSCH is not received from the base station, where a PID of an HARQ corresponding to the second PDSCH is the same as the first PID, and the secondary component carrier is provided for the terminal to transmit an HARQ of the PID.

In an embodiment, when transmitting PDSCHs to the terminal, the base station may determine PIDs of the HARQs corresponding to the PDSCHs. The PIDs corresponding to the PDSCHs may be configured by the base station. Therefore, the HARQ information transmitted by the terminal to the base station based on the corresponding PDSCH may have a corresponding PID.

In this embodiment, in order to distinguish the PIDs corresponding to different PDSCHs, the HARQ PID corresponding to the first PDSCH is referred to as a first PID, and the HARQ PID corresponding to the second PDSCH is referred to as a second PID, where the first PDSCH and the second PDSCH are different PDSCHs (for example, carry different information).

As shown in FIG. 2, after the base station transmits the first PDSCH to the terminal on the primary component carrier, if the base station on the secondary component carrier, when not receiving, the HARQ information of the first PID from the terminal, transmits the second PDSCH to the terminal on the primary component carrier, namely, a moment t2 of receiving the HARQ information corresponding to the first PDSCH is later than a moment t1 of transmitting the second PDSCH to the terminal, and the second PID of the HARQ corresponding to the second PDSCH is the same as the first PID, the terminal will mistake the second PDSCH as retransmission of the first PDSCH. Thus, causing issues.

In the embodiments of the present disclosure, after the base station transmits the first PDSCH to the terminal on the primary component carrier, the base station can transmit the second PDSCH to the terminal on the primary component carrier only when receiving, on the secondary component carrier, the HARQ information of the first PID from the terminal, where the second PID of the HARQ corresponding to the second PDSCH may be the same as the first PID. Since the base station already receives the HARQ information of the first PID, that is, the action of feeding back the HARQ of the first PDSCH at the terminal side is already completed, when the second PDSCH is transmitted to the terminal, the second PDSCH will not be mistaken as retransmission of the first PDSCH even though the PID of the second PDSCH is the same as the first PID.

Furthermore, after the base station transmits the first PDSCH to the terminal on the primary component carrier, if the base station, when not receiving, on the secondary component carrier, the HARQ information of the first PID from the terminal, transmits the second PDSCH to the terminal on the primary component carrier, the second PID of the HARQ corresponding to the second PDSCH may be set to be different from the first PID, and thus the terminal can distinguish different PDSCHs based on the PIDs when the action of feeding back the HARQ of the first PDSCH is not completed.

In an embodiment, the HARQ information may include at least one of: confirming that HARQ information of PDSCH is successfully decoded and confirming HARQ information of PDSCH is not successfully decoded.

When the terminal confirms a PDSCH is successfully decoded, the HARQ information transmitted to the base station may be HARQ acknowledgment information, i.e. HARQ-ACK. When the terminal confirms a PDSCH is not successfully decoded, the HARQ information transmitted to the base station may be HARQ negative-acknowledgment information, i.e. HARQ-NACK.

Figure 10:
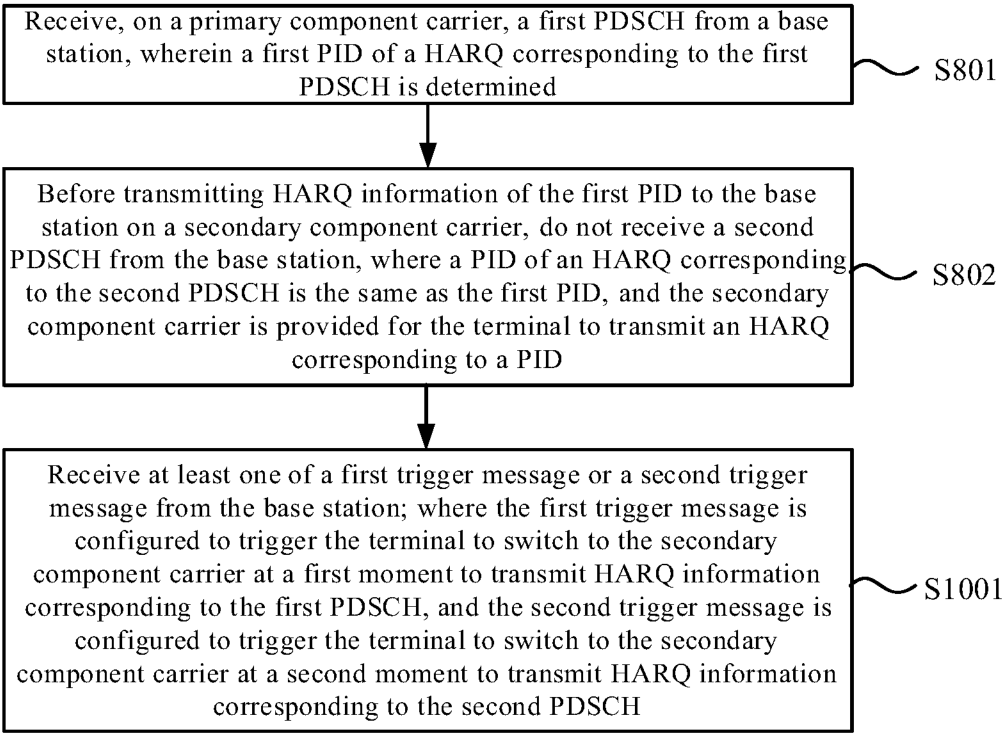
FIG. 10 is a schematic flowchart illustrating a PDSCH receiving method according to another embodiment of the present disclosure.

FIG. 10 is a schematic flowchart illustrating another PDSCH receiving method according to an embodiment of the present disclosure. As shown in FIG. 10, the method includes steps S801 and S802, previously described, and further includes the following step S1001.

At step S1001, at least one of a first trigger message or a second trigger message is received from the base station.

The first trigger message is configured to trigger the terminal to switch to the secondary component carrier at a first moment to transmit HARQ information corresponding to the first PDSCH, and the second trigger message is configured to trigger the terminal to switch to the secondary component carrier at a second moment to transmit HARQ information corresponding to the second PDSCH.

In an embodiment, the base station may also transmit the first trigger message and/or the second trigger message based on requirements in addition to transmitting the first PDSCH and the second PDSCH to the terminal.

For example, when a PUCCH resource for transmitting the HARQ information corresponding to the first PDSCH on the primary component carrier is not available temporarily, the first trigger message may be transmitted to the terminal to trigger the terminal to switch to the secondary component carrier to transmit the HARQ information corresponding to the first PDSCH, for example, switch to the secondary component carrier at the first moment, where the moment may be configured by the base station based on requirements.

For example, when a PUCCH resource for transmitting the HARQ information corresponding to the second PDSCH on the primary component carrier is not available temporarily, the second trigger message may be transmitted to the terminal to trigger the terminal to switch to the secondary component carrier to transmit the HARQ information corresponding to the second PDSCH, for example, switch to the secondary component carrier at the second moment, where the moment may be configured by the base station based on requirements.

It should be noted that the first trigger message and the second trigger message may indicate the terminal to switch to a same secondary component carrier or different secondary component carrier, which may be determined by the base station based on requirements.

In an embodiment, the temporary unavailability of the resource may include at least one of: resource unavailability, discard of this feedback operation, retransmission trigger and delay of this feedback operation.

FIG. 11 is a schematic flowchart illustrating a PDSCH receiving method according to an embodiment of the present disclosure. The PDSCH receiving method in this embodiment may be performed by a terminal. The terminal may communicate with a base station. The terminal includes but not limited to a communication device such as a smart phone, a tablet computer, a wearable device, a sensor or an internet-of-things device or the like. The base station includes but not limited to a base station in a communication system of 4G, 5G or 6G or the like.

As shown in FIG. 11, the PDSCH receiving method may include the following steps S1101 to S1102.

At step S1101, a first PDSCH, a second PDSCH, a first trigger message, and a second trigger message are received on a primary component carrier from a base station. Where the first trigger message is configured to trigger the terminal to switch to a secondary component carrier to transmit HARQ information corresponding to the first PDSCH and the second trigger message is configured to trigger the terminal to switch to the secondary component carrier to transmit HARQ information corresponding to the second PDSCH.

At step S1102, on a first time domain resource of the secondary component carrier, HARQ information corresponding to the first PDSCH is transmitted to the base station, and on a second time domain resource of the secondary component carrier, HARQ information corresponding to the second PDSCH is transmitted to the base station. Where when a moment of transmitting the first trigger message is earlier than a moment of transmitting the second trigger message, the first time domain resource is earlier than the second time domain resource.

In an embodiment, the base station may also transmit the first trigger message and the second trigger message to the terminal in addition to transmitting the first PDSCH and the second PDSCH.

For example, when the PUCCH resource for transmitting the HARQ information corresponding to the first PDSCH on the primary component carrier is temporarily unavailable, the first trigger message may be transmitted to the terminal to trigger the terminal to switch to the secondary component carrier to transmit the HARQ information corresponding to the first PDSCH.

For example, when the PUCCH resource for transmitting the HARQ information corresponding to the second PDSCH on the primary component carrier is temporarily unavailable, the second trigger message may be transmitted to the terminal to trigger the terminal to switch to the secondary component carrier to transmit the HARQ information corresponding to the second PDSCH.

In an embodiment, the terminal may switch to the secondary component carrier to transmit the HARQ information corresponding to the first PDSCH and the HARQ information corresponding to the second PDSCH to the base station. The base station may, on the first time domain resource of the secondary component carrier, receive the HARQ information corresponding to the first PDSCH from the terminal, and on the second time domain resource of the secondary component carrier, receive the HARQ information corresponding to the second PDSCH from the terminal.

As shown in FIG. 5, when a moment t1' of transmitting, by the base station, the first trigger message is earlier than a moment t2' of transmitting, by the base station, the second trigger message, namely, the base station first transmits the first trigger message and then transmits the second trigger message, the base station generally defaults that the HARQ information corresponding to the first PDSCH is firstly received and then the HARQ information corresponding to the second PDSCH is received.

If the first time domain resource t4' is later than the second time domain resource t3', that is, if the terminal firstly transmits the HARQ information corresponding to the second PDSCH to the base station and then transmits the HARQ information corresponding to the first PDSCH to the base station, the base station will mistake the HARQ information corresponding to the second PDSCH as the HARQ information corresponding to the first trigger message, i.e. the HARQ information corresponding to the first PDSCH.

In the embodiments of the present disclosure, when the moment of transmitting the first trigger message is earlier than the moment of transmitting the second trigger message, the base station may set the first time domain resource to be earlier than the second time domain resource. For example, configuring the first trigger message and the second trigger message, to ensure the terminal firstly transmits the HARQ information corresponding to the first PDSCH to the base station and then transmits the HARQ information corresponding to the second PDSCH to the base station. In this way, the base station can correctly determine the firstly-received HARQ information corresponding to the first trigger message as the HARQ information corresponding to the first trigger message, i.e. the HARQ information corresponding to the first PDSCH.

In an embodiment, the base station may also, based on requirements, set the moment of transmitting the second trigger message to be later than the first time domain resource. In this case, the base station can transmit the second trigger message to the terminal only when receiving the HARQ information corresponding to the first PDSCH on the first time domain resource and thus the terminal can transmit the HARQ information corresponding to the second PDSCH to the base station. As a result, it is guaranteed that the second time domain resource on which the base station receives the HARQ information corresponding to the second PDSCH is surely later than the first time domain resource. In this way, the base station can correctly determine the firstly-received HARQ information corresponding to the first PDSCH as the HARQ information corresponding to the first trigger message, i.e. the HARQ information corresponding to the first PDSCH.

In an embodiment, the first time domain resource includes an ending position of the HARQ information corresponding to the first PDSCH on time domain, and the second time domain resource includes an ending position of the HARQ information corresponding to the second PDSCH on time domain.

It is to be noted that the meanings expressed by the first time domain resource and the second time domain resource respectively may be determined based on requirements. For example, as shown in FIG. 5, the first time domain resource is a start position of the HARQ information corresponding to the first PDSCH on time domain, and the second time domain resource is a start position of the HARQ information corresponding to the second PDSCH on time domain. Alternatively, the first time domain resource is an ending position of the HARQ information corresponding to the first PDSCH on time domain, and the second time domain resource is a start position of the HARQ information corresponding to the second PDSCH on time domain.

In an embodiment, when a time domain resource for transmitting the first PDSCH is earlier than a time domain resource for transmitting the second PDSCH, the moment of transmitting the first trigger message is earlier than the moment of transmitting the second trigger message.

In an embodiment, when the time domain resource for transmitting, by the base station, the first PDSCH is earlier than the time domain resource for transmitting, by the base station, the second PDSCH, the moment of transmitting the first trigger message may be set to be earlier than the moment of transmitting the second trigger message. Thus, it is guaranteed that the terminal can, in a case of firstly receiving the first PDSCH and then the second PDSCH, firstly receive the first trigger message and then the second trigger message. Therefore, the terminal can be correctly triggered based on the first trigger message to switch to the secondary component carrier to transmit the HARQ corresponding to the first PDSCH.

FIG. 12 is a schematic flowchart illustrating a PDSCH receiving method according to an embodiment of the present disclosure. The PDSCH receiving method in this embodiment may be performed by a terminal. The terminal may communicate with a base station. The terminal includes but not limited to a communication device such as a smart phone, a tablet computer, a wearable device, a sensor or an internet-of-things device or the like. The base station includes but not limited to a base station in a communication system of 4G, 5G or 6G or the like.

As shown in FIG. 12, the PDSCH receiving method may include the following step S1201.

At step S1201, a first trigger message and a second trigger message are received from a base station. The first trigger message is configured to trigger the terminal to switch to a secondary component carrier to transmit a HARQ corresponding to a first PDSCH, and the second trigger message is configured to trigger the terminal to switch to the secondary component carrier to transmit an HARQ corresponding to a second PDSCH. When a time domain resource for transmitting the first PDSCH is earlier than a time domain resource for transmitting the second PDSCH, a moment of transmitting the first trigger message is earlier than a moment of transmitting the second trigger message.

In an embodiment, the base station may transmit the first trigger message and the second trigger message to the terminal in addition to transmitting the first PDSCH and the second PDSCH to the terminal. The first trigger message and the second trigger message may be transmitted on a physical downlink control channel (PDCCH) resource.

For example, when a PUCCH resource for transmitting the HARQ information corresponding to the first PDSCH on the primary component carrier is not available temporarily, the first trigger message may be transmitted to the terminal to trigger the terminal to switch to the secondary component carrier to transmit the HARQ information corresponding to the first PDSCH.

For example, when a PUCCH resource for transmitting the HARQ information corresponding to the second PDSCH on the primary component carrier is not available temporarily, the second trigger message may be transmitted to the terminal to trigger the terminal to switch to the secondary component carrier to transmit the HARQ information corresponding to the second PDSCH.

In an embodiment, when the time domain resource for transmitting, by the base station, the first PDSCH is earlier than the time domain resource for transmitting, by the base station, the second PDSCH, that is, the base station firstly transmits the first PDSCH to the terminal and then transmits the second PDSCH to the terminal, if the moment of transmitting the first trigger message is later than the moment of transmitting the second trigger message, the terminal will firstly receive the first PDSCH and then the second PDSCH but firstly receive the second trigger message and then the first trigger message.

When the terminal first receives the first PDSCH and then the second PDSCH, it is generally defaulted that the firstly-received trigger message is configured to trigger the terminal to switch to the secondary component carrier to transmit the HARQ corresponding to the first PDSCH. When the terminal firstly receives the second trigger message, it is mistaken that the second trigger message is configured to trigger the terminal to switch to the secondary component carrier to transmit the HARQ corresponding to the first PDSCH, leading to the problems of switching to an incorrect secondary component carrier and switching at an incorrect time and the like.

In the embodiments of the present disclosure, when the time domain resource for transmitting, by the base station, the first PDSCH is earlier than the time domain resource for transmitting, by the base station, the second PDSCH, the moment of transmitting the first trigger message may be set to be earlier than the moment of transmitting the second trigger message. Thus, it is ensured that the terminal can, in a case of firstly receiving the first PDSCH and then the second PDSCH, firstly receive the first trigger message and then the second trigger message. Therefore, the terminal can be correctly triggered based on the first trigger message to switch to the secondary component carrier to transmit the HARQ corresponding to the first PDSCH. Thus, providing an improvement over the technical issues of currently known systems and methods.

In an embodiment, the first trigger message triggers the terminal to switch to the secondary component carrier at the first moment to transmit the HARQ corresponding to the first PDSCH, and the second trigger message triggers the terminal to switch to the secondary component carrier at the second moment to transmit the HARQ corresponding to the second PDSCH.

When the time domain resource for transmitting the first trigger message is earlier than the time domain resource for transmitting the second trigger message, the first moment is earlier than the second moment.

In an embodiment, the first trigger message may trigger the terminal to switch to the secondary component carrier at the first moment to transmit the HARQ corresponding to the first PDSCH, and the second trigger message may trigger the terminal to switch to the secondary component carrier at the second moment to transmit the HARQ corresponding to the second PDSCH, where the first moment and the second moment may be set by the base station based on requirements.

As shown in FIG. 7, when the time domain resource t1" for transmitting the first trigger message is earlier than the time domain resource t2" for transmitting the second trigger message, if the first moment is later than the second moment, the base station firstly transmits the first trigger message and then the second trigger message to the terminal but the first moment at which the first trigger message triggers the terminal to transmit HARQ is later than the second moment t3" at which the second trigger message triggers the terminal to transmit HARQ.

When the terminal firstly receives the first trigger message and then the second trigger message, it is generally defaulted that the terminal firstly switches to the secondary component carrier to transmit the HARQ corresponding to the first trigger message. But, since the first moment is later than the second moment, the terminal will mistakenly switch to the secondary component carrier at the second moment to transmit the HARQ corresponding to the first trigger message, i.e. the HARQ corresponding to the first PDSCH.

In the embodiments of the present disclosure, when the time domain resource for transmitting the first trigger message is earlier than the time domain resource for transmitting the second trigger message, the first moment may be set to be earlier than the second moment. Therefore, it can be guaranteed that in a case that the terminal firstly receives the first trigger message and then the second trigger message, the first moment at which the first trigger message triggers the terminal to transmit HARQ is also earlier than the second moment at which the second trigger message triggers the terminal to transmit HARQ. In this way, switching can be correctly performed to the secondary component carrier based on the first moment to transmit the HARQ corresponding to the first trigger message, namely, the HARQ corresponding to the first PDSCH. Therefore, providing an improvement over the technical issues of currently known systems and methods.

In an embodiment, the base station may set the moment of transmitting the second trigger message to be later than the first time domain resource. That is, the base station may, after receiving the HARQ information corresponding to the first PDSCH on the first time domain resource, transmit the second trigger message to the terminal. Thus, the terminal can further transmit the HARQ information corresponding to the second PDSCH to the base station. In this case, it is guaranteed that the first moment at which the first trigger message triggers the terminal to transmit HARQ is surely earlier than the second moment at which the second trigger message triggers the terminal to transmit HARQ. Therefore, the terminal can correctly switch to the secondary component carrier based on the first moment to transmit the HARQ corresponding to the first trigger message, namely, the HARQ corresponding to the first PDSCH. Therefore, providing an improvement over the technical issues of currently known systems and methods.

In an embodiment, when the moment of transmitting the first trigger message is earlier than the moment of transmitting the second trigger message, the first time domain resource is earlier than the second time domain resource.

In an embodiment, when the moment of transmitting the first trigger message is earlier than the moment of transmitting the second trigger message, the base station may set the first time domain resource to be earlier than the second time domain resource, for example, configure the first trigger message and the second trigger message, to ensure the terminal firstly transmits the HARQ information corresponding to the first PDSCH to the base station and then transmits the HARQ information corresponding to the second PDSCH to the base station. In this way, the base station can correctly determine the firstly-received HARQ information corresponding to the first trigger message as the HARQ information corresponding to the first PDSCH.

Corresponding to the included embodiments of the transmission control method and the PDSCH receiving method, the present disclosure further provides embodiments of a transmission control apparatus and a PDSCH receiving apparatus.

An embodiment of the present disclosure provides a transmission control apparatus which is applied to a base station. The base station may communicate with a terminal. The terminal includes but not limited to a communication device such as a smart phone, a tablet computer, a wearable device, a sensor or an internet-of-things device or the like. The base station includes but not limited to a base station in a communication system of 4G, 5G or 6G or the like.

In an embodiment, the transmission control apparatus includes one or more processors, where the processor is configured to perform operations including: transmitting, on a primary component carrier, a first PDSCH to a terminal, and determine a first PID of a HARQ corresponding to the first PDSCH; and before HARQ information of the first PID transmitted by the terminal is received on a secondary component carrier, not transmitting a second PDSCH to the terminal, where a PID of an HARQ corresponding to the second PDSCH is the same as the first PID, and the secondary component carrier is provided for the terminal to transmit an HARQ of the PID.

In an embodiment, the HARQ information may include at least one of: confirming that HARQ information of PDSCH is successfully decoded and confirming HARQ information of PDSCH is not successfully decoded.

In an embodiment, the operations further include: transmitting at least one of a first trigger message or a second trigger message to the terminal; where the first trigger message is configured to trigger the terminal to switch to the secondary component carrier at a first moment to transmit the HARQ information corresponding to the first PDSCH, and the second trigger message is configured to trigger the terminal to switch to the secondary component carrier at a second moment to transmit the HARQ information corresponding to the second PDSCH.

An embodiment of the present disclosure provides a transmission control apparatus which is applied to a base station. The base station may communicate with a terminal. The terminal includes but not limited to a communication device such as a smart phone, a tablet computer, a wearable device, a sensor or an internet-of-things device or the like. The base station includes but not limited to a base station in a communication system of 4G, 5G or 6G or the like.

In an embodiment, the transmission control apparatus includes one or more processors, where the processor is configured to perform operations including: transmitting, on a primary component carrier, a first PDSCH, a second PDSCH, a first trigger message and a second trigger message to a terminal, where the first trigger message is configured to trigger the terminal to switch to a secondary component carrier to transmit HARQ information corresponding to the first PDSCH and the second trigger message is configured to trigger the terminal to switch to the secondary component carrier to transmit HARQ information corresponding to the second PDSCH; and receiving, on a first time domain resource of the secondary component carrier, the HARQ information corresponding to the first PDSCH from the terminal, and receive, on a second time domain resource of the secondary component carrier, the HARQ information corresponding to the second PDSCH from the terminal, where when a moment of transmitting the first trigger message is earlier than a moment of transmitting the second trigger message, the first time domain resource is earlier than the second time domain resource.

In an embodiment, the moment of transmitting the second trigger message is later than the first time domain resource.

In an embodiment, the first time domain resource includes an ending position of the HARQ information corresponding to the first PDSCH on time domain, and the second time domain resource includes an ending position of the HARQ information corresponding to the second PDSCH on time domain.

In an embodiment, when a time domain resource for transmitting the first PDSCH is earlier than a time domain resource for transmitting the second PDSCH, the moment of transmitting the first trigger message is earlier than the moment of transmitting the second trigger message.

An embodiment of the present disclosure provides a transmission control apparatus, which is applied to a base station. The base station may communicate with a terminal. The terminal includes but not limited to a communication device such as a smart phone, a tablet computer, a wearable device, a sensor or an internet-of-things device or the like. The base station includes but not limited to a base station in a communication system of 4G, 5G or 6G or the like.

In an embodiment, the transmission control apparatus includes one or more processors, where the processor is configured to perform operations including: transmitting a first trigger message and a second trigger message to a terminal; where the first trigger message is configured to trigger the terminal to switch to a secondary component carrier to transmit a HARQ corresponding to a first PDSCH, and the second trigger message is configured to trigger the terminal to switch to the secondary component carrier to transmit an HARQ corresponding to a second PDSCH; when a time domain resource for transmitting the first PDSCH is earlier than a time domain resource for transmitting the second PDSCH, a moment of transmitting the first trigger message is earlier than a moment of transmitting the second trigger message.

In an embodiment, the first trigger message triggers the terminal to switch to the secondary component carrier at a first moment to transmit the HARQ corresponding to the first PDSCH, and the second trigger message triggers the terminal to switch to the secondary component carrier at a second moment to transmit the HARQ corresponding to the second PDSCH; when a time domain resource for transmitting the first trigger message is earlier than a time domain resource for transmitting the second trigger message, the first moment is earlier than the second moment.

In an embodiment, the moment of transmitting the second trigger message is later than the first time domain resource.

An embodiment of the present disclosure provides a PDSCH receiving apparatus, which is applied to a terminal. The terminal may communicate with a base station. The terminal includes but not limited to a communication device such as a smart phone, a tablet computer, a wearable device, a sensor or an internet-of-things device or the like. The base station includes but not limited to a base station in a communication system of 4G, 5G or 6G or the like.

In an embodiment, the PDSCH receiving apparatus includes one or more processors, where the processor is configured to perform operations including: receiving, on a primary component carrier, a first PDSCH from a base station, where a first PID of a HARQ corresponding to the first PDSCH is determined; and before transmitting HARQ information of the first PID to the base station on a secondary component carrier, not receiving a second PDSCH from the base station, where a PID of an HARQ corresponding to the second PDSCH is the same as the first PID, and the secondary component carrier is provided for the terminal to transmit an HARQ of the PID.

In an embodiment, the HARQ information includes at least one of: confirming that HARQ information of PDSCH is successfully decoded and confirming HARQ information of PDSCH is not successfully decoded.

In an embodiment, the operations further include: receiving at least one of a first trigger message or a second trigger message from the base station; where the first trigger message is configured to trigger the terminal to switch to the secondary component carrier at a first moment to transmit HARQ information corresponding to the first PDSCH, and the second trigger message is configured to trigger the terminal to switch to the secondary component carrier at a second moment to transmit HARQ information corresponding to the second PDSCH.

An embodiment of the present disclosure provides a PDSCH receiving apparatus, which is applied to a terminal. The terminal may communicate with a base station. The terminal includes but not limited to a communication device such as a smart phone, a tablet computer, a wearable device, a sensor or an internet-of-things device or the like. The base station includes but not limited to a base station in a communication system of 4G, 5G or 6G or the like.

In an embodiment, the PDSCH receiving apparatus includes one or more processors, where the processor is configured to perform operations including: receiving, on a primary component carrier, a first PDSCH, a second PDSCH, a first trigger message and a second trigger message from a base station, where the first trigger message is configured to trigger the terminal to switch to a secondary component carrier to transmit HARQ information corresponding to the first PDSCH and the second trigger message is configured to trigger the terminal to switch to the secondary component carrier to transmit HARQ information corresponding to the second PDSCH; transmit, on a first time domain resource of the secondary component carrier, HARQ information corresponding to the first PDSCH to the base station, and transmitting, on a second time domain resource of the secondary component carrier, HARQ information corresponding to the second PDSCH to the base station, where when a moment of transmitting the first trigger message is earlier than a moment of transmitting the second trigger message, the first time domain resource is earlier than the second time domain resource.

In an embodiment, the moment of transmitting the second trigger message is later than the first time domain resource.

In an embodiment, the first time domain resource includes an ending position of the HARQ information corresponding to the first PDSCH on time domain, and the second time domain resource includes an ending position of the HARQ information corresponding to the second PDSCH on time domain.

In an embodiment, when a time domain resource for transmitting the first PDSCH is earlier than a time domain resource for transmitting the second PDSCH, the moment of transmitting the first trigger message is earlier than the moment of transmitting the second trigger message.

An embodiment of the present disclosure provides a PDSCH receiving apparatus, which is applied to a terminal. The terminal may communicate with a base station. The terminal includes but not limited to a communication device such as a smart phone, a tablet computer, a wearable device, a sensor or an internet-of-things device or the like. The base station includes but not limited to a base station in a communication system of 4G, 5G or 6G or the like.

In an embodiment, the PDSCH receiving apparatus includes one or more processors, where the processor is configured to perform operations including: receiving a first trigger message and a second trigger message from a base station; where the first trigger message is configured to trigger the terminal to switch to a secondary component carrier to transmit a HARQ corresponding to a first PDSCH, and the second trigger message is configured to trigger the terminal to switch to the secondary component carrier to transmit an HARQ corresponding to a second PDSCH; when a time domain resource for transmitting the first PDSCH is earlier than a time domain resource for transmitting the second PDSCH, a moment of transmitting the first trigger message is earlier than a moment of transmitting the second trigger message.

In an embodiment, the first trigger message triggers the terminal to switch to the secondary component carrier at a first moment to transmit the HARQ corresponding to the first PDSCH, and the second trigger message triggers the terminal to switch to the secondary component carrier at a second moment to transmit the HARQ corresponding to the second PDSCH; when a time domain resource for transmitting the first trigger message is earlier than a time domain resource for transmitting the second trigger message, the first moment is earlier than the second moment.

In an embodiment, the moment of transmitting the second trigger message is later than the first time domain resource.

The specific manner in which each module in the apparatuses in the embodiments performs operations has been detailed in the method embodiments and will not be repeated herein.

Since the apparatus embodiments substantially correspond to the method embodiments, a reference may be made to part of the descriptions of the method embodiments for the related part. The apparatus embodiments described herein are merely illustrative, where the modules described as separate members may be or not be physically separated, and the members displayed as modules may be or not be physical modules, i.e., may be located in one place, or may be distributed to a plurality of network modules. Part or all of the modules may be selected according to actual requirements to implement the objectives of the solutions in the embodiments. Those of ordinary skill in the art may understand and carry out them without creative work.

An embodiment of the present disclosure further provides a communication device, including a processor; a memory storing computer programs, where the computer programs are executed by the processor to perform the transmission control method in any one of the included embodiments.

An embodiment of the present disclosure further provides a communication device, including a processor; a memory storing computer programs, where the computer programs are executed by the processor to perform the PDSCH receiving method in any one of the included embodiments.

An embodiment of the present disclosure further provides a non-transitory computer readable storage medium storing computer programs, where the computer programs are executed by a processor to perform the steps of the transmission control method in any one of the included embodiments.

An embodiment of the present disclosure further provides a non-transitory computer readable storage medium storing computer programs, where the computer programs are executed by a processor to perform the steps of the PDSCH receiving method in any one of the included embodiments.

Figure 13:
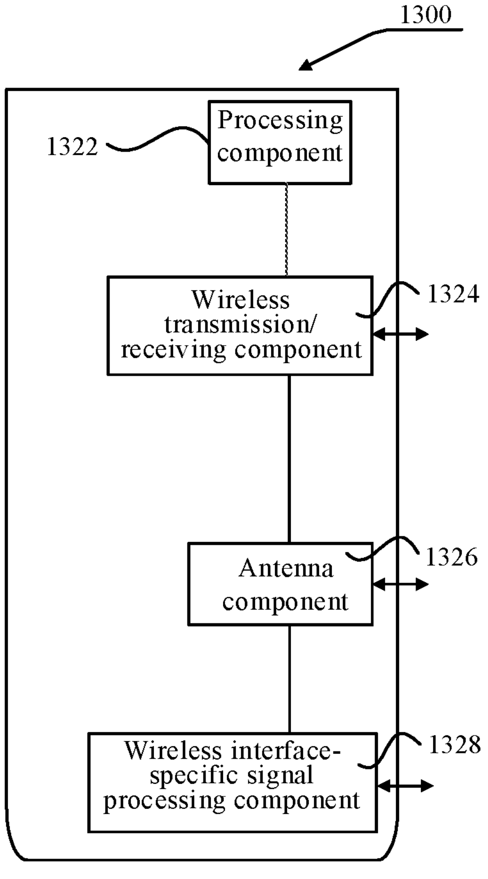
FIG. 13 is a schematic block diagram illustrating a transmission control apparatus according to an embodiment of the present disclosure.

FIG. 13 is a schematic block diagram illustrating an apparatus 1300 for transmission control according to an embodiment of the present disclosure. The apparatus 1300 may be provided as a base station. With reference to FIG. 13, the apparatus 1300 includes a processing component 1322, a wireless transmission/receiving component 1324, an antenna component 1326, and a wireless interface-specific signal processing component 1328. The processing component 1322 may further include one or more processors (not shown), and one processor of the processing component 1322 may be configured to perform the transmission control method in any one of the included embodiments. The wireless transmission/receiving component 1324 can be any known component, or components, capable of transmitting and/or receiving signals, such as, but not limited to an input/output (I/O) device, transmitter, receiver, antenna, and/or the like. The wireless interface-specific signal processing component 1328 can be any known component, or components, capable of processing interface-specific signals, such as, but not limited to microprocessors, digital signal processors (DSP), and the like.

Figure 14:
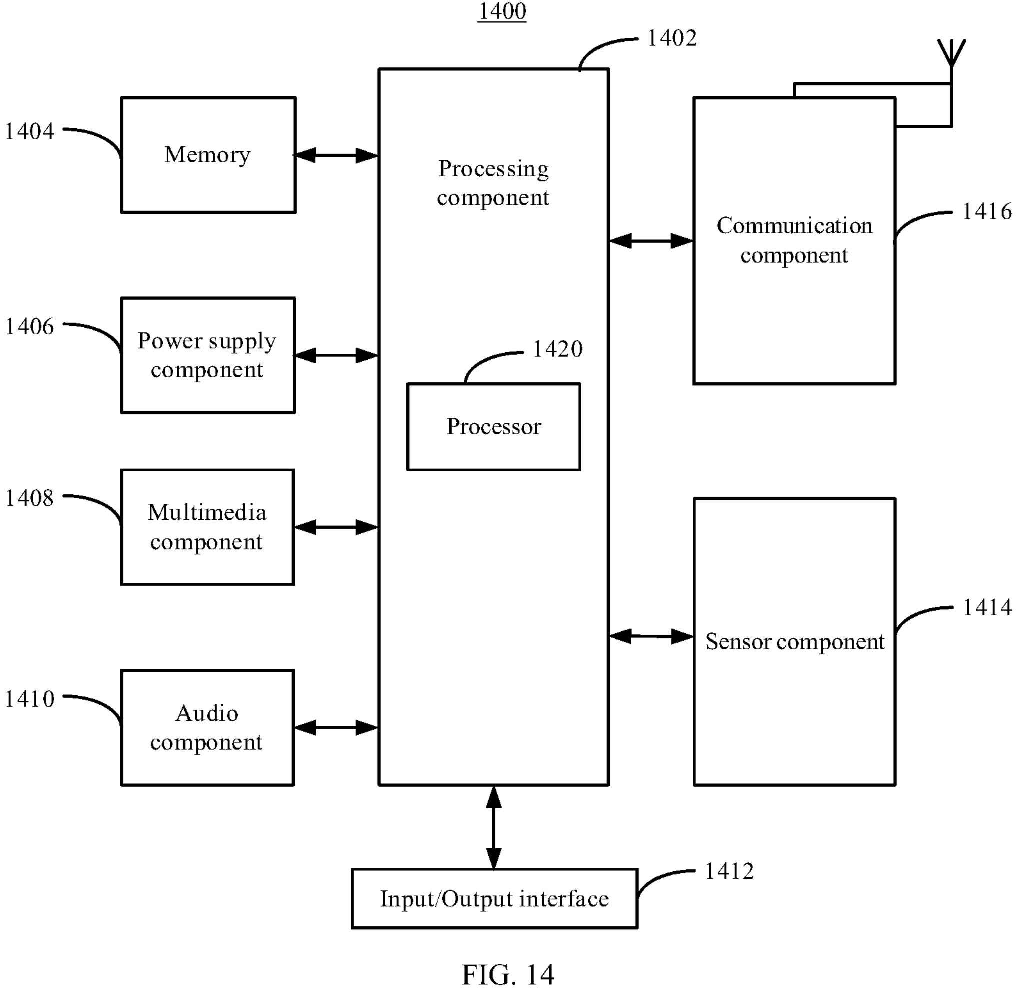
FIG. 14 is a schematic block diagram illustrating a PDSCH receiving apparatus according to an embodiment of the present disclosure.

FIG. 14 is a schematic block diagram illustrating an apparatus 1400 for PDSCH reception according to an embodiment of the present disclosure. For example, the apparatus 1400 may include a mobile phone, a computer, a digital broadcast terminal, a message transceiver, a game console, a tablet device, a medical device, a fitness device, and a personal digital assistant and the like.

As shown in FIG. 14, the apparatus 1400 may include one or more of the following components: a processing component 1402, a memory 1404, a power supply component 1406, a multimedia component 1408, an audio component 1410, an input/output (I/O) interface 1412, a sensor component 1414 and a communication component 1416.

The processing component 1402 generally controls overall operations of the apparatus 1400, such as operations associated with display, phone calls, data communications, camera operations, and recording operations. The processing component 1402 may include one or more processors 1420 to execute instructions to complete all or part of the steps of any of included PDSCH receiving methods. In addition, the processing component 1402 may include one or more modules which facilitate the interaction between the processing component 1402 and other components. For example, the processing component 1402 may include a multimedia module to facilitate the interaction between the multimedia component 1408 and the processing component 1402.

The memory 1404 is configured to store various types of data to support the operation of the apparatus 1400. Examples of such data include instructions for any application or method operated on the apparatus 1400, contact data, phonebook data, messages, pictures, videos, and so on. The memory 1404 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1406 supplies power for different components of the apparatus 1400. The power supply component 1406 may include a power supply management system, one or more power supplies, and other components associated with generating, managing and distributing power for the apparatus 1400.

The multimedia component 1408 includes a screen that provides an output interface between the apparatus 1400 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1408 includes a front camera and/or a rear camera. When the apparatus 1400 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1410 is configured to output and/or input audio signals. For example, the audio component 1410 includes a microphone (MIC) configured to receive an external audio signal when the apparatus 1400 is in an operation mode, such as a call mode, a recording mode, and a voice recognition mode. The received audio signal may be further stored in the memory 1404 or transmitted via the communication component 1416. In some examples, the audio component 1410 also includes a loudspeaker for outputting an audio signal.

The I/O interface 1412 provides an interface between the processing component 1402 and a peripheral interface module which may be a keyboard, a click wheel, a button, or the like. These buttons may include, but are not limited to a home button, a volume button, a start button, and a lock button.

The sensor component 1414 includes one or more sensors for providing a status assessment in various aspects to the apparatus 1400. For example, the sensor component 1414 may detect an open/closed state of the apparatus 1400, and the relative positioning of a component, for example, the component is a display and a keypad of the apparatus 1400. The sensor component 1414 may also detect a change in position of the apparatus 1400 or a component of the apparatus 1400, the presence or absence of a user in contact with the apparatus 1400, the orientation or acceleration/deceleration of the apparatus 1400 and a change in temperature of the apparatus 1400. The sensor component 1414 may include a proximity sensor configured to detect the presence of nearby objects without any physical contact. The sensor component 1414 may also include a light sensor, such as a CMOS or CCD image sensor, for use in imaging applications. In some examples, the sensor component 1414 may also include an acceleration sensor, a gyro sensor, a magnetic sensor, a pressure sensor, or a temperature sensor.

The communication component 1416 is configured to facilitate wired or wireless communication between the apparatus 1400 and other devices. The apparatus 1400 may access a wireless network based on a communication standard, such as WiFi, 2G or 3G, or 4G LTE or 5G NR or a combination thereof. In an example, the communication component 1416 receives broadcast signals or broadcast associated information from an external broadcast management system via a broadcast channel. In an example, the communication component 1416 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an exemplary embodiment, the apparatus 1400 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing any of the included PDSCH receiving methods.

In an exemplary embodiment, there is provided a non-transitory computer readable storage medium including instructions, for example, a memory 1404 including instructions. The instructions may be executed by a processor 1420 of the apparatus 1400 to complete any of the included PDSCH receiving methods. For example, the non-transitory computer readable storage medium may be Read Only Memory (ROM), a Random Access Memory (RAM), a CD-ROM, a magnetic tape, a floppy disk and an optical data storage device the like.

In some embodiments, a transmission control method, performed by a base station, comprises: transmitting, on a primary component carrier, a first physical downlink shared channel (PDSCH) to a terminal, and determining a first process identifier (PID) of a hybrid automatic repeat request (HARQ) corresponding to the first PDSCH; and before HARQ information of the first PID sent by the terminal is received on a secondary component carrier, not transmitting a second PDSCH to the terminal, wherein a PID of an HARQ corresponding to the second PDSCH is the same as the first PID, and the secondary component carrier is provided for the terminal to transmit an HARQ corresponding to a PID.

In some embodiments, the method further comprises: transmitting at least one of a first trigger message or a second trigger message to the terminal; wherein the first trigger message is configured to trigger the terminal to switch to the secondary component carrier at a first moment to transmit the HARQ information corresponding to the first PDSCH, and the second trigger message is configured to trigger the terminal to switch to the secondary component carrier at a second moment to transmit HARQ information corresponding to the second PDSCH.

In some embodiments, a transmission control method, performed by a base station, comprises: transmitting, on a primary component carrier, a first physical downlink shared channel (PDSCH), a second PDSCH, a first trigger message and a second trigger message to a terminal, wherein the first trigger message is configured to trigger the terminal to switch to a secondary component carrier to transmit hybrid automatic repeated request (HARQ) information corresponding to the first PDSCH, and the second trigger message is configured to trigger the terminal to switch to the secondary component carrier to transmit HARQ information corresponding to the second PDSCH; and receiving, on a first time domain resource of the secondary component carrier, the HARQ information corresponding to the first PDSCH from the terminal, and receiving, on a second time domain resource of the secondary component carrier, the HARQ information corresponding to the second PDSCH from the terminal, wherein when a moment of transmitting the first trigger message is earlier than a moment of transmitting the second trigger message, the first time domain resource is earlier than the second time domain resource.

In some embodiments, the moment of transmitting the second trigger message is later than the first time domain resource.

In some embodiments, the first time domain resource comprises an ending position of the HARQ information corresponding to the first PDSCH on time domain, and the second time domain resource comprises an ending position of the HARQ information corresponding to the second PDSCH on time domain.

In some embodiments, when a time domain resource for transmitting the first PDSCH is earlier than a time domain resource for transmitting the second PDSCH, the moment of transmitting the first trigger message is earlier than the moment of transmitting the second trigger message.

In some embodiments, a transmission control method, performed by a base station, comprises: transmitting a first trigger message and a second trigger message to a terminal; wherein the first trigger message is configured to trigger the terminal to switch to a secondary component carrier to transmit a hybrid automatic repeated request (HARQ) corresponding to a first physical downlink shared channel (PDSCH), and the second trigger message is configured to trigger the terminal to switch to the secondary component carrier to transmit an HARQ corresponding to a second PDSCH; when a time domain resource for transmitting the first PDSCH is earlier than a time domain resource for transmitting the second PDSCH, a moment of transmitting the first trigger message is earlier than a moment of transmitting the second trigger message.

In some embodiments, the first trigger message triggers the terminal to switch to the secondary component carrier at a first moment to transmit the HARQ corresponding to the first PDSCH, and the second trigger message triggers the terminal to switch to the secondary component carrier at a second moment to transmit the HARQ corresponding to the second PDSCH; when a time domain resource for transmitting the first trigger message is earlier than a time domain resource for transmitting the second trigger message, the first moment is earlier than the second moment.

In some embodiments, the moment of transmitting the second trigger message is later than the first time domain resource.

In some embodiments, a physical downlink shared channel (PDSCH) receiving method, performed by a terminal, comprises: receiving, on a primary component carrier, a first PDSCH from a base station, wherein a first process identifier (PID) of a hybrid automatic repeat request (HARQ) corresponding to the first PDSCH is determined; and before transmitting HARQ information of the first PID to the base station on a secondary component carrier, not receiving a second PDSCH from the base station, wherein a PID of an HARQ corresponding to the second PDSCH is the same as the first PID, and the secondary component carrier is provided for the terminal to transmit an HARQ corresponding to a PID.

In some embodiments, the method further comprises: receiving at least one of a first trigger message or a second trigger message from the base station; wherein the first trigger message is configured to trigger the terminal to switch to the secondary component carrier at a first moment to transmit HARQ information corresponding to the first PDSCH, and the second trigger message is configured to trigger the terminal to switch to the secondary component carrier at a second moment to transmit HARQ information corresponding to the second PDSCH.

In some embodiments, a physical downlink shared channel (PDSCH) receiving method, performed by a terminal, comprises: receiving, on a primary component carrier, a first PDSCH, a second PDSCH, a first trigger message and a second trigger message from a base station, wherein the first trigger message is configured to trigger the terminal to switch to a secondary component carrier to transmit hybrid automatic repeated request (HARQ) information corresponding to the first PDSCH, and the second trigger message is configured to trigger the terminal to switch to the secondary component carrier to transmit HARQ information corresponding to the second PDSCH; and transmitting, on a first time domain resource of the secondary component carrier, HARQ information corresponding to the first PDSCH to the base station, and transmitting, on a second time domain resource of the secondary component carrier, HARQ information corresponding to the second PDSCH to the base station, wherein when a moment of transmitting the first trigger message is earlier than a moment of transmitting the second trigger message, the first time domain resource is earlier than the second time domain resource.

In some embodiments, the moment of transmitting the second trigger message is later than the first time domain resource.

In some embodiments, the first time domain resource comprises an ending position of the HARQ information corresponding to the first PDSCH on time domain, and the second time domain resource comprises an ending position of the HARQ information corresponding to the second PDSCH on time domain.

In some embodiments, when a time domain resource for transmitting the first PDSCH is earlier than a time domain resource for transmitting the second PDSCH, the moment of transmitting the first trigger message is earlier than the moment of transmitting the second trigger message.

In some embodiments, a physical downlink shared channel (PDSCH) receiving method, performed by a terminal, comprises: receiving a first trigger message and a second trigger message from a base station; wherein the first trigger message is configured to trigger the terminal to switch to a secondary component carrier to transmit a hybrid automatic repeated request (HARQ) corresponding to a first PDSCH, and the second trigger message is configured to trigger the terminal to switch to the secondary component carrier to transmit an HARQ corresponding to a second PDSCH; when a time domain resource for transmitting the first PDSCH is earlier than a time domain resource for transmitting the second PDSCH, a moment of transmitting the first trigger message is earlier than a moment of transmitting the second trigger message.

In some embodiments, the first trigger message triggers the terminal to switch to the secondary component carrier at a first moment to transmit the HARQ corresponding to the first PDSCH, and the second trigger message triggers the terminal to switch to the secondary component carrier at a second moment to transmit the HARQ corresponding to the second PDSCH; when a time domain resource for transmitting the first trigger message is earlier than a time domain resource for transmitting the second trigger message, the first moment is earlier than the second moment.

In some embodiments, the moment of transmitting the second trigger message is later than the first time domain resource.

In some embodiments, a transmission control apparatus, comprising one or more processors, wherein the processor is configured to perform operations comprising: transmitting, on a primary component carrier, a first physical downlink shared channel (PDSCH) to a terminal, and determining a first process identifier (PID) of a hybrid automatic repeat request (HARQ) corresponding to the first PDSCH; and before HARQ information of the first PID sent by the terminal is received on a secondary component carrier, not transmitting a second PDSCH to the terminal, wherein a PID of an HARQ corresponding to the second PDSCH is the same as the first PID, and the secondary component carrier is provided for the terminal to transmit an HARQ corresponding to a PID.

In some embodiments, a transmission control apparatus, comprising one or more processors, wherein the processor is configured to perform operations comprising: transmitting, on a primary component carrier, a first physical downlink shared channel (PDSCH), a second PDSCH, a first trigger message and a second trigger message to a terminal, wherein the first trigger message is configured to trigger the terminal to switch to a secondary component carrier to transmit hybrid automatic repeated request (HARQ) information corresponding to the first PDSCH, and the second trigger message is configured to trigger the terminal to switch to the secondary component carrier to transmit HARQ information corresponding to the second PDSCH; and receiving, on a first time domain resource of the secondary component carrier, the HARQ information corresponding to the first PDSCH from the terminal, and receiving, on a second time domain resource of the secondary component carrier, the HARQ information corresponding to the second PDSCH from the terminal, wherein when a moment of transmitting the first trigger message is earlier than a moment of transmitting the second trigger message, the first time domain resource is earlier than the second time domain resource.

In some embodiments, a transmission control apparatus, comprising one or more processors, wherein the processor is configured to perform operations comprising: transmitting a first trigger message and a second trigger message to a terminal; wherein the first trigger message is configured to trigger the terminal to switch to a secondary component carrier to transmit a hybrid automatic repeated request (HARQ) corresponding to a first physical downlink shared channel (PDSCH), and the second trigger message is configured to trigger the terminal to switch to the secondary component carrier to transmit an HARQ corresponding to a second PDSCH; when a time domain resource for transmitting the first PDSCH is earlier than a time domain resource for transmitting the second PDSCH, a moment of transmitting the first trigger message is earlier than a moment of transmitting the second trigger message.

In some embodiments, a physical downlink shared channel (PDSCH) receiving apparatus, comprising one or more processors, wherein the processor is configured to perform operations comprising: receiving, on a primary component carrier, a first PDSCH from a base station, wherein a first process identifier (PID) of a hybrid automatic repeat request (HARQ) corresponding to the first PDSCH is determined; and before transmitting HARQ information of the first PID to the base station on a secondary component carrier, not receiving a second PDSCH from the base station, wherein a PID of an HARQ corresponding to the second PDSCH is the same as the first PID, and the secondary component carrier is provided for the terminal to transmit an HARQ corresponding to a PID.

In some embodiments, a physical downlink shared channel (PDSCH) receiving apparatus, comprising one or more processors, wherein the processor is configured to perform operations comprising: receiving, on a primary component carrier, a first PDSCH, a second PDSCH, a first trigger message and a second trigger message from a base station, wherein the first trigger message is configured to trigger the terminal to switch to a secondary component carrier to transmit hybrid automatic repeated request (HARQ) information corresponding to the first PDSCH, and the second trigger message is configured to trigger the terminal to switch to the secondary component carrier to transmit HARQ information corresponding to the second PDSCH; and transmitting, on a first time domain resource of the secondary component carrier, HARQ information corresponding to the first PDSCH to the base station, and transmitting, on a second time domain resource of the secondary component carrier, HARQ information corresponding to the second PDSCH to the base station, wherein when a moment of transmitting the first trigger message is earlier than a moment of transmitting the second trigger message, the first time domain resource is earlier than the second time domain resource.

In some embodiments, a physical downlink shared channel (PDSCH) receiving apparatus, comprising one or more processors, wherein the processor is configured to perform operations comprising: receiving a first trigger message and a second trigger message from a base station; wherein the first trigger message is configured to trigger the terminal to switch to a secondary component carrier to transmit a hybrid automatic repeated request (HARQ) corresponding to a first PDSCH, and the second trigger message is configured to trigger the terminal to switch to the secondary component carrier to transmit an HARQ corresponding to a second PDSCH; when a time domain resource for transmitting the first PDSCH is earlier than a time domain resource for transmitting the second PDSCH, a moment of transmitting the first trigger message is earlier than a moment of transmitting the second trigger message.

In some embodiments, a communication device, comprising: a processor; and a memory storing computer programs; wherein the computer programs, when executed by the processor, cause the processor to perform the method.

In some embodiments, a non-transitory computer readable storage medium, storing computer programs thereon, wherein the computer programs, when executed by a processor, cause the processor to perform the method.

In the embodiments of the present disclosure, before the HARQ information of the first PID transmitted by the terminal is received on the secondary component carrier, the second PDSCH with the same HARQ PID as the first PID will not be transmitted to the terminal, so as to ensure communication with the terminal based on a logic allowed by the base station.

In the embodiments of the present disclosure, when the moment of transmitting the first trigger message is earlier than the moment of transmitting the second trigger message, the base station may set the first time domain resource to be earlier than the second time domain resource, for example, configure the first trigger message and the second trigger message, to ensure the terminal firstly transmits the HARQ information corresponding to the first PDSCH to the base station and then transmits the HARQ information corresponding to the second PDSCH to the base station. In this way, the base station can correctly determine the firstly-received HARQ information corresponding to the first trigger message as the HARQ information corresponding to the first PDSCH.

In the embodiments of the present disclosure, when the time domain resource for transmitting the first PDSCH is earlier than the time domain resource for transmitting the second PDSCH, the base station may set the moment of transmitting the first trigger message to be earlier than the moment of transmitting the second trigger message, to ensure the terminal can firstly receive the first trigger message and then the second trigger message in response to firstly receiving the first PDSCH and then the second PDSCH. Therefore, the terminal is correctly triggered based on the first trigger message to switch to the secondary component carrier to transmit the HARQ corresponding to the first PDSCH.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described herein and shown in the accompanying drawings, and that various modifications and changes may be made without departing from the scope thereof. The scope of the present disclosure is limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The included are detailed descriptions of the methods and the apparatuses provided according to the embodiments of the present disclosure. Specific examples are used herein to set forth the principles and the implementing methods of the present disclosure, and the descriptions of the included embodiments are only meant to help understanding of the methods and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A transmission control method, performed by a base station and comprising:

transmitting, on a primary component carrier, a first physical downlink shared channel (PDSCH) to a terminal, and determining a first process identifier (PID) of a hybrid automatic repeat request (HARQ) corresponding to the first PDSCH; and not transmitting a second PDSCH to the terminal until the HARQ information of the first PID sent by the terminal is received on a secondary component carrier, wherein a second PID of a second HARQ corresponding to the second PDSCH is the same as the first PID, and the secondary component carrier is provided for the terminal to transmit at least one of the first HARQ corresponding to the first PID or the second HARQ corresponding to the second PID.

2. The method of claim 1, further comprising:

transmitting, to the terminal, at least one of a first trigger message or a second trigger message;

wherein the first trigger message is configured to, at a first moment, trigger the terminal to switch to the secondary component carrier to transmit the HARQ information corresponding to the first PDSCH, and wherein the second trigger message is configured to, at a second moment, trigger the terminal to switch to the secondary component carrier to transmit second HARQ information corresponding to the second PDSCH.

3. A transmission control method, performed by a base station, and comprising:

transmitting, on a primary component carrier, a first physical downlink shared channel (PDSCH), a second PDSCH, a first trigger message, and a second trigger message to a terminal, wherein the first trigger message is configured to trigger the terminal to switch to a secondary component carrier to transmit first hybrid automatic repeated request (HARQ) information corresponding to the first PDSCH, and the second trigger message is configured to trigger the terminal to switch to the secondary component carrier to transmit second HARQ information corresponding to the second PDSCH; and receiving, on a first time domain resource of the secondary component carrier, the first HARQ information from the terminal, and receiving, on a second time domain resource of the secondary component carrier, the second HARQ information from the terminal, and wherein when a first moment of transmitting the first trigger message is earlier than a second moment of transmitting the second trigger message, the first time domain resource is earlier than the second time domain resource.

4. The method of claim 3, wherein the second moment is after the first time domain resource.

5. The method of claim 4, wherein the first time domain resource comprises an ending position of the first HARQ information within a time domain corresponding to the first PDSCH, and the second time domain resource comprises an ending position of the second HARQ information within the time domain corresponding to the second PDSCH.

6. The method of claim 3, wherein when a time domain resource for transmitting the first PDSCH is earlier than a different time domain resource for transmitting the second PDSCH, the first moment of transmitting the first trigger message is earlier than the second moment of transmitting the second trigger message.

7. A communication device, comprising:

a processor; and a memory storing computer programs, and wherein the computer programs, when executed by the processor, cause the processor to perform the method of claim 1.

8. A communication device, comprising:

a processor; and a memory storing computer programs, and wherein the computer programs, when executed by the processor, cause the processor to perform the method of claim 3.

9. A non-transitory computer readable storage medium, storing computer programs thereon, wherein the computer programs, when executed by a processor, cause the processor to perform the method of claim 1.

10. A non-transitory computer readable storage medium, storing computer programs thereon, wherein the computer programs, when executed by a processor, cause the processor to perform the method of claim 3.

11. A physical downlink shared channel (PDSCH) receiving method, performed by a terminal, and comprising:

receiving, on a primary component carrier, a first PDSCH, a second PDSCH, a first trigger message and a second trigger message from a base station, wherein the first trigger message is configured to trigger the terminal to switch to a secondary component carrier to transmit first hybrid automatic repeated request (HARQ) information corresponding to the first PDSCH, and the second trigger message is configured to trigger the terminal to switch to the secondary component carrier to transmit second HARQ information corresponding to the second PDSCH; and transmitting, on a first time domain resource of the secondary component carrier, the first HARQ information to the base station, and transmitting, on a second time domain resource of the secondary component carrier, the second HARQ information to the base station, wherein when a first moment of transmitting the first trigger message is earlier than a second moment of transmitting the second trigger message, the first time domain resource is earlier than the second time domain resource.

12. The method of claim 11, wherein the second moment is after the first time domain resource.

13. The method of claim 11, wherein the first time domain resource comprises an ending position of the first HARQ information within a time domain corresponding to the first PDSCH, and the second time domain resource comprises an ending position of the second HARQ information within the time domain corresponding to the second PDSCH.

14. The method of claim 11, wherein when a time domain resource for transmitting the first PDSCH is earlier than a different time domain resource for transmitting the second PDSCH, the first moment of transmitting the first trigger message is earlier than the second moment of transmitting the second trigger message.

15. A communication device, comprising:

a processor; and a memory storing computer programs, and wherein the computer programs, when executed by the processor, cause the processor to perform the method of claim 11.

16. A non-transitory computer readable storage medium, storing computer programs thereon, wherein the computer programs, when executed by a processor, cause the processor to perform the method of claim 11.

* * * * *